(12) United States Patent
Ishihara et al.

(10) Patent No.: US 8,054,435 B2
(45) Date of Patent: Nov. 8, 2011

(54) LIQUID CRYSTAL PANEL AND LIQUID CRYSTAL DISPLAY DEVICE

(75) Inventors: Shoichi Ishihara, Osaka (JP); Takehisa Sakurai, Osaka (JP); Shuichi Kozaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 143 days.

(21) Appl. No.: 12/486,431

(22) Filed: Jun. 17, 2009

(65) Prior Publication Data

US 2009/0316098 A1 Dec. 24, 2009

(30) Foreign Application Priority Data

Jun. 18, 2008 (JP) .................................. 2008-159390
Feb. 19, 2009 (WO) .................. PCT/JP2009/052835
May 29, 2009 (JP) .................................. 2009-131560

(51) Int. Cl.
*G02F 1/1343* (2006.01)
(52) U.S. Cl. ....................................... 349/141
(58) Field of Classification Search .................... 349/141
See application file for complete search history.

(56) References Cited

U.S. PATENT DOCUMENTS

| 5,550,664 | A | 8/1996 | Tsuda et al. |
| 6,181,402 | B1 | 1/2001 | Shim et al. |
| 6,704,083 | B1 | 3/2004 | Kim et al. |
| 6,781,657 | B1 | 8/2004 | Kim et al. |
| 2003/0197824 | A1 | 10/2003 | Shim et al. |
| 2004/0114084 | A1 | 6/2004 | Kim et al. |
| 2005/0151911 | A1 | 7/2005 | Kim et al. |
| 2007/0146603 | A1* | 6/2007 | Uehara et al. ................. 349/141 |

FOREIGN PATENT DOCUMENTS

| JP | 57-000618 A | 1/1982 |
| JP | 10-186351 A | 7/1998 |
| JP | 2000-275682 A | 10/2000 |
| JP | 2002-055357 A | 2/2002 |
| WO | 99/32924 A1 | 7/1999 |

OTHER PUBLICATIONS

Ohmuro et al, "Development of Super-High-Image-Quality Vertical-Alignment-Mode LCD", SID 1997 Digest, No. 33.3, p. 845-848, 1997.
Yoshida et al, "Multi-domain Vertically Aligned LCDs with Super-wide Viewing Range for Gray-scale Images", Asia Display/IMID'04 Digest, No. 12.2, p. 198-201, 2004.
Soref, "Field Effects in Nematic Liquid Crystals Obtained with Interdigital Electrodes", J. Appl. Phys., vol. 45, No. 12, p. 5466-5468, 1974.

(Continued)

*Primary Examiner* — James Dudek
(74) *Attorney, Agent, or Firm* — Nixon & Vanderhye P.C.

(57) ABSTRACT

A liquid crystal panel includes: a p-type liquid crystal material sandwiched by a pair of substrates and comb-teeth shape electrodes for applying, to the p-type liquid crystal material, an electric field parallel to a substrate surface. The p-type liquid crystal material is aligned vertically with respect to the substrate surface at the time when no electric field is applied. The comb-teeth shape electrodes have an electrode width of 5 μm or less, and an electrode spacing of 15 μm or less. A product of a dielectric constant anisotropy Δε and a refractive index anisotropy Δn of the p-type liquid crystal material is 1.3 or more and 3.1 or less.

14 Claims, 16 Drawing Sheets

OTHER PUBLICATIONS

Kiefer et al, "In-Plane Switching of Nematic Liquid Crystals", Proc. The 12th Int'l Disp. Res. Conf. (Japan Display'92), No. P2-30, p. 547-550, 1992.

Bos et al, "An Optically "Self-Compensating" Electro-Optical Effect with Wide Angle of View", Technical Digest of SID Symp., p. 273-276, 1993.

Yamaguchi et al, "Wide-Viewing-Angle Display Mode for the Active-Matrix LCD Using Bend-Alignment Liquid-Crystal Cell", Technical Digest of SID Symp., p. 277-280, 1993.

"Vertically-Aligned Transflective Liquid Crystal Display with Patterned Electrodes"; Do et al., IDW '03, pp. 153-156.

"The Electro-Optic Properties of a Vertically Aligned Fast Response Liquid Crystal Display with Three-Electrode Driving"; Xiang et al., Journal of Physics D: Applied Physics; vol. 37, No. 7, Apr. 7, 2004, pp. 994-997.

"23.1: Fast-Switching LCD with Multi-Domain Vertical Alignment Driven by an Oblique Electric Field"; Yoshida et al., 2000 SID International Symposium, May 16-18, 2000, vol. XXXI, pp. 334-337.

Supplementary European Search Report dated Jun. 8, 2011.

* cited by examiner

WHEN VOLTAGE IS APPLIED

LIQUID CRYSTAL PANEL AND LIQUID CRYSTAL DISPLAY DEVICE

This Nonprovisional application claims priority under 35 U.S.C. §119(a) on Patent Application No. 2008-159390 filed in Japan on Jun. 18, 2008, International Application No. PCT/JP2009/052835 filed on Feb. 19, 2009, and Patent Application No. 2009-131560 filed in Japan on May 29, 2009, and the entire contents of which are hereby incorporated by reference.

FIELD OF THE INVENTION

The present invention relates to a liquid crystal panel and a liquid crystal display device, in particular, to a liquid crystal panel and a liquid crystal display device each controlling transmission of light by causing bend distortion of a liquid crystal layer by voltage application.

BACKGROUND OF THE INVENTION

Liquid crystal display devices have a small thickness, a light weight, and a low power consumption as characteristics, and are used in various fields. Display performance of such liquid crystal display devices is drastically improved year by year. As a result, recently the display performance of liquid crystal display devices has become superior to that of CRTs (cathode ray tubes).

A display mode of a liquid crystal display device is determined by how liquid crystal is aligned in a liquid crystal cell. Conventionally, various display modes are known as display modes of liquid crystal display devices. Examples of such display modes known are a TN (Twisted Nematic) mode, an MVA (Multi-domain Vertical Alignment) mode, an IPS (In-Plain Switching) mode, and an OCB (Optically Compensated Birefringence) mode. Liquid crystal display devices employing these display methods have been mass-produced conventionally.

Among the liquid crystal display devices of these various display modes above, for example, a liquid crystal display device employing the TN mode is generally used in a wide range.

However, a liquid crystal display device employing the TN mode has disadvantages such as a slow response and a narrow viewing angle.

The MVA mode (Refer to, for example, "K. Ohmuro, S. Kataoka, T. Sasaki, and Y. Koike, 'Development of Super-High-Image-Quality Vertical-Alignment-Mode LCD', SID 1997 Digest, No. 33.3, p. 845-848, 1997." (hereinafter, referred to as "Non-Patent Document 1") and "H. Yoshida, T. Kamada, K. Ueda, R. Tanaka, Y. Koike, K. Okamoto, P. L. Chen and J. Lin, 'Multi-domain Vertically Aligned LCDs with Super-wide Viewing Range for Gray-scale Images', Asia Display/IMID'04 Digest, No. 12.2, (2004)." (hereinafter, referred to as "Non-Patent Document 2")) is a display mode according to which a fringe field is formed by providing a slit to each pixel electrode on an active matrix substrate and, further, providing a rib for controlling liquid crystal molecule alignment to a counter electrode on a counter substrate, thereby providing a plurality of alignment directions of liquid crystal molecules.

The MVA mode liquid crystal display device achieves a wide viewing angle by having a plurality of divisional directions (Multi-domains) in each of which liquid crystal molecules are tilted at the time when a voltage is applied. Further, employing a vertical alignment mode, the MVA mode liquid crystal display device can obtain a higher contrast as compared with liquid crystal display devices of other modes such as the TN mode, the IPS mode, and the OCB mode. However, the MVA mode liquid crystal display has disadvantages such that (i) a production process is complex and (ii) as with the TN mode liquid crystal display device, a response speed is slow.

Among the other display modes described above, the IPS mode (Refer, for example, to "R. A. Soref, 'Field Effects in Nematic Liquid Crystals Obtained with Interdigital Electrodes', J. Appl. Phys., Vol. 45, No. 12, p. 5466-5468, 1974." (hereinafter, referred to as "Non-Patent Document 3") and "R. Kiefer, B. Weber, F. Windschield, and G. Baur, 'In-Plane Switching of Nematic Liquid Crystals', Proc. The 12th Int'l Disp. Res. Conf. (Japan Display'92), No. P2-30, p. 547-550, 1992." (hereinafter, referred to as "Non-Patent Document 4")) is known as a display mode according to which a wide viewing angle is achieved by using a simpler configuration. Switching the liquid crystal molecules within a plane, the IPS mode liquid crystal display device has a very wide viewing angle. However, the IPS mode also has a disadvantage such that a response speed is slow as with the TN mode and the MVA mode. Further, the IPS mode is not suitable for mobile devices or in-vehicle devices for which a high speed at a low temperature is required.

Meanwhile, among the various display modes, the OCB mode (Refer, for example, to "P. L. Bos and J. A. Rahman, 'An Optically "Self-Compensating" Electro-Optical Effect with Wide Angle of View', Technical Digest of SID Symp., p. 273-276, 1993." (hereinafter, referred to as "Non-Patent Document 5") and "Y. Yamaguchi, T. Miyashita, and T. Uchida, 'Wide-Viewing-Angle Display Mode for the Active-Matrix LCD Using Bend-Alignment Liquid-Crystal Cell', Technical Digest of SID Symp., p. 277-280, 1993." (hereinafter, referred to as "Non-Patent Document 6")) is an only display mode that can achieve a high-speed response by using a simple configuration in which a nematic liquid crystal is merely sandwiched by two substrates having been subjected to alignment treatment in parallel directions. Therefore, the OCB mode is particularly spotlighted for in-vehicle applications in which a response characteristic at a low temperature may become a problem.

However, while exhibiting such a high-speed response, the OCB mode requires a transition operation from a splay alignment that is an initial alignment to a bend alignment in driving when power supply is turned on. Accordingly, the OCB mode requires an initial transition driving circuit in addition to an ordinary driving circuit. Therefore, a factor to increase cost is inherent in the OCB mode. Further, the OCB mode is inferior in a viewing angle characteristic to the MVA mode and IPS mode.

Other than the display mode as described above, another display mode is proposed for solving a process problem of the MVA mode. This display mode carries out driving by a lateral electric field in a vertical alignment mode, employing a p-type nematic liquid crystal as a liquid crystal material (Refer to, for example, Japanese Patent Application Publication, Tokukaishou, No. 57-618 (published on Jan. 5, 1982) (hereinafter, referred to as "Patent Document 1"), Japanese Patent Application Publication, Tokukaihei, No. 10-186351 (published on Jul. 14, 1998) (hereinafter, referred to as "Patent Document 2"), Japanese Patent Application Publication, Tokukaihei, No. 10-333171 (published on Dec. 18, 1998) (hereinafter, referred to as "Patent Document 3"), Japanese Patent Application Publication, Tokukaihei, No. 11-24068 (published on Jan. 29, 1999) (hereinafter, referred to as "Patent Document 4"), Japanese Patent Application Publication, Tokukai, No. 2000-275682 (published on Oct. 6, 2000) (hereinafter, referred to as "Patent Document 5"), and Japanese Patent Application Publication, Tokukai, No. 2002-55357 (published on Feb. 20, 2002) (hereinafter, referred to as "Patent Document 6")).

In this display mode, while a high contrast characteristic due to vertical alignment is maintained, driving is carried out by using a lateral electric field so that an alignment direction of liquid crystal molecules is defined. In the display mode, a pixel configuration is simple because alignment control by a rib as in the MVA mode is not necessary. Further, the display mode has an excellent viewing angle characteristic.

Patent Documents 3 and 4 disclose that: a bent electric field is formed by electric field application; two domains having liquid crystal directors in directions different from each other by 180 degrees are formed; and, as a result, a wide viewing angle is obtained.

However, the display mode described above has a serious problem such that a driving voltage is high and a light transmittance is low, though having a high contrast and an excellent viewing angle characteristic as described above. Further, as in the MVA mode, a response characteristic of the display mode is not sufficient for moving image display. Therefore, this display mode has not been put to practical use yet.

Therefore, there has been no known liquid crystal panel and liquid crystal display device each of which can simultaneously achieve characteristics of a high-speed response, a wide viewing angle, and a high contrast.

SUMMARY OF INVENTION

The present invention is attained in view of the above problems. An object of the present invention is to provide a practical liquid crystal panel and a practical liquid crystal display device each of which is capable of simultaneously achieving characteristics of a high-speed response, a wide viewing angle, and a high contrast.

Under the circumstances, as a result of diligent studies, the applicants of the present application found that: (i) a degree of bend alignment (a degree of bending of p-type liquid crystal molecules in bend alignment) can be controlled by setting, to appropriate conditions, a panel configuration and physical property values of a liquid crystal material and (ii) a high light transmittance can be obtained by a practical driving voltage, by controlling the degree of bend alignment. As a result, the applicants of the present application have achieved the present invention. As a result, a high light transmittance could be first obtained by using a practical driving voltage.

In order to solve the problems described above, a liquid crystal panel of the present invention includes: a liquid crystal material sandwiched by a pair of substrates; and electrodes for applying, to the liquid crystal material, an electric field parallel to a substrate surface, the liquid crystal material including a p-type liquid crystal material, the p-type liquid crystal material being vertically aligned with respect to the substrate surface at the time when no electric field is applied, the electrodes having an electrode width of 5 μm or less and an electrode spacing of 15 μm or less, the p-type liquid crystal material having, in a range of 1.3 to 3.1, a product ($\Delta\epsilon \cdot \Delta n$) of a dielectric constant anisotropy $\Delta\epsilon$ and a refractive index anisotropy $\Delta n$.

Note that, in the present invention, "applying an electric field parallel to a substrate surface" means "applying an electric field that at least includes a component parallel to a substrate surface". Further, "the p-type liquid crystal material being vertically aligned with respect to the substrate surface" means "the p-type liquid crystal material at least including an alignment component vertical with respect to the substrate surface". In other words, the meanings of the terms "parallel" and "vertical" includes "substantially parallel" and "substantially vertical".

The liquid crystal panel is driven by a so-called lateral electric field that is parallel to the substrate surface, while a high contrast characteristic due to vertical alignment is maintained. This makes it possible to achieve a wide viewing angle characteristic and a high contrast characteristic by a simple pixel configuration. Moreover, because an initial bend transition operation is unnecessary, practical bend alignment can be achieved.

In the liquid crystal panel, as in a case of an OCB mode, when liquid crystal molecules are to move, liquid crystal molecule flows operate in a direction assisting the movement of the liquid crystal molecules. Therefore, a high-speed response becomes possible. A characteristic of such a high-speed response corresponds to a degree of bend alignment. In the liquid crystal panel, the degree of bend alignment depends on physical properties (in particular $\Delta\epsilon \cdot \Delta n$) of the liquid crystal material. However, the degree of bend alignment also varies in accordance with the electrode width and the electrode spacing of the electrodes. By setting the values of the electrode width and the electrode spacing within the above range, it becomes possible to obtain a liquid crystal panel in which a degree of deformation of the liquid crystal alignment is greater than that of a conventional configuration.

In particular, by setting the electrode width of the electrodes to 5 μm or less and the electrode spacing of the electrodes to 15 μm or less, a high transmittance can be obtained by a practical driving voltage. Further, by setting the $\Delta\epsilon \cdot \Delta n$ to be in a range of 1.3 to 3.1, a high transmittance and a characteristic of a high-speed response can be obtained practically. Therefore, according to the above configuration, it becomes possible to provide a practical liquid crystal panel capable of simultaneously achieving characteristics of (i) a wide viewing angle equivalent to those of an MVA mode and an IPS mode, (ii) a high-speed response as fast as or faster than that of the OCB mode, and (iii) a high contrast.

Further, in order to solve the problems mentioned above, a liquid crystal display device of the present invention includes the liquid crystal panel of the present invention.

Therefore, the present invention makes it possible to provide a practical display device capable of simultaneously achieving characteristics of a high-speed response, a wide viewing angle, and a high contrast.

Other objects, features, and superior points of the present invention can be fully understood by the ensuing detailed description. Further, the detailed explanation reveals advantages of the invention in conjunction with the accompanying drawings.

DESCRIPTION OF THE EMBODIMENTS

The following explains in detail embodiments of the present invention.

Embodiment 1

One embodiment of the present invention is explained below with reference to FIGS. 1 to 17(b).

Figure 3:
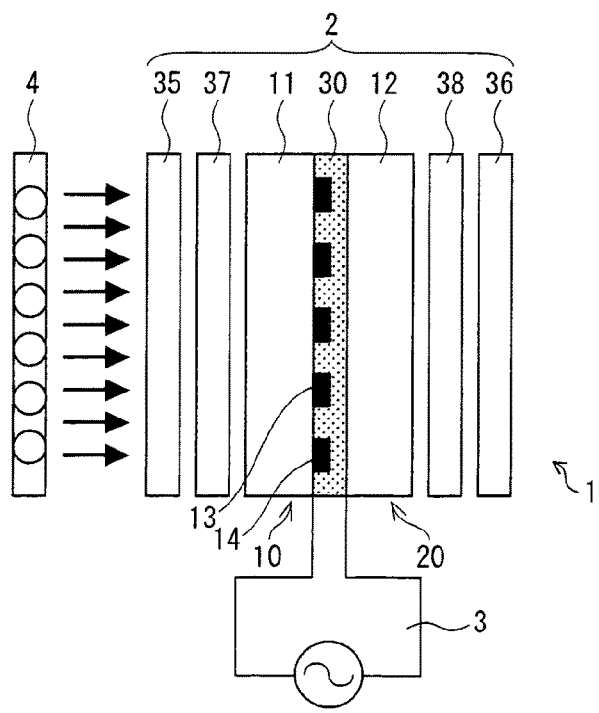
FIG. 3 is an exploded cross sectional view schematically illustrating an outline configuration of a liquid crystal display device according to one embodiment of the present invention.

FIG. 3 is an exploded cross sectional view schematically illustrating an outline configuration of a liquid crystal display device according to the present embodiment.

As illustrated in FIG. 3, a liquid crystal display device 1 of the present embodiment includes a liquid crystal panel 2, a driving circuit 3, and a backlight 4 (illumination device). Configurations of the driving circuit 3 and the backlight 4 are the same as configurations of conventional driving circuit and backlight, and explanations thereof are omitted.

Figure 1:
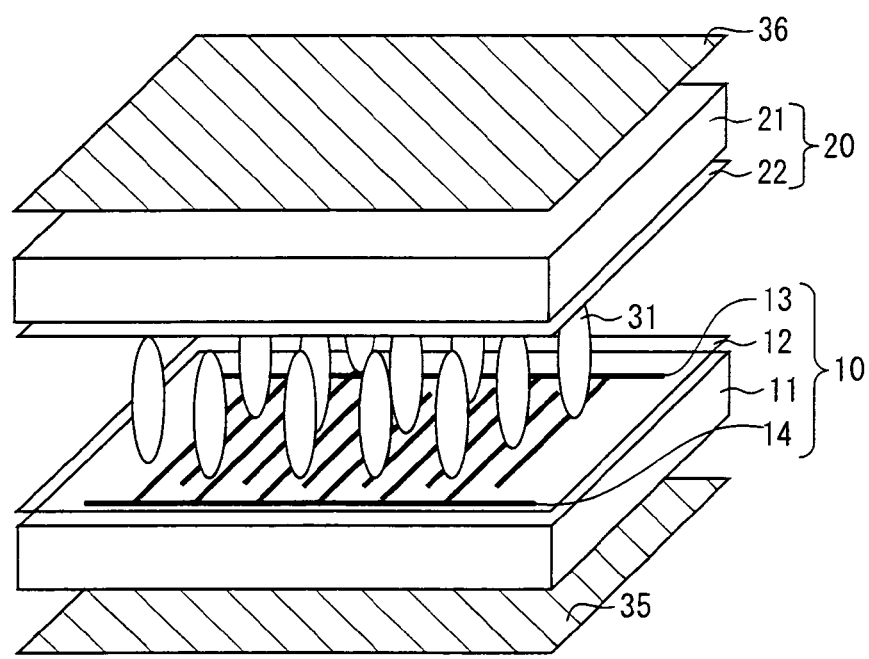
FIG. 1 is an exploded perspective view schematically illustrating an outline configuration of a substantial part of a liquid crystal panel according to one embodiment of the present invention.
Figure 2:
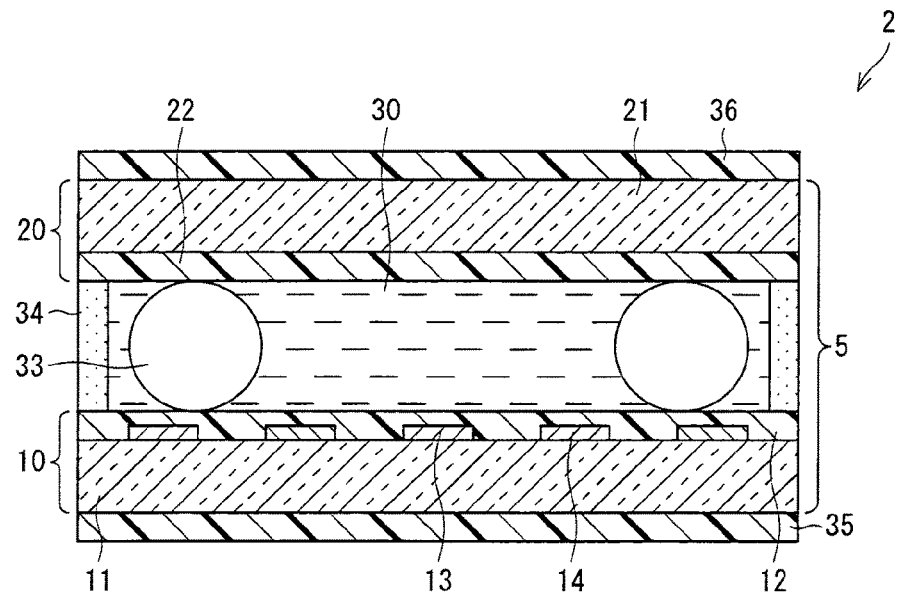
FIG. 2 is a cross sectional view schematically illustrating an outline configuration of a substantial part of the liquid crystal panel shown in FIG. 1.

FIGS. 1 and 2 show a typical panel configuration as one example of the liquid crystal panel 2 according to the present embodiment.

FIG. 1 is an exploded perspective view schematically illustrating an outline configuration of a substantial part of the liquid crystal panel 2. FIG. 2 is a cross sectional view schematically illustrating an outline configuration of a substantial part of the liquid crystal panel 2.

In the following explanation, it is assumed that a substrate on a display surface side (a substrate on a side where a viewer is present) is an upper substrate and the other substrate is a lower substrate.

As shown in FIGS. 1 through 3, the liquid crystal panel 2 of the present embodiment includes a pair of substrates 10 and 20 provided as an electrode substrate (array substrate, element substrate) and a counter substrate, so as to be opposed to each other. The pair of substrates 10 and 20 sandwich a liquid crystal layer 30 that is provided as a medium layer for display and that includes a p-type liquid crystal material.

At least one of the pair of substrates 10 and 20 includes a transparent substrate such as a glass substrate. Further, one surface of the substrate 10 which surface is opposed to the substrate 20 is provided with an alignment film 12 that is a so-called vertical alignment film, and one surface of the substrate 20 which surface is opposed to the substrate 10 is provided with an alignment film 22 that is also a so-called vertical alignment film.

The vertical alignment film is an alignment film that aligns, vertically with respect to a substrate surface, liquid crystal molecules of a liquid crystal layer, when no electric filed is applied. Note that meaning of the term "vertically" includes "substantially vertically".

Accordingly, as illustrated in FIG. 1, p-type liquid crystal molecules 31 of the liquid crystal layer 30 exhibit homeotropic alignment, when no voltage is applied.

Further, one of the substrates 10 and 20 includes electric field application means to apply, to the liquid crystal layer 30, an electric field that is parallel to the substrate surface. This electric field is a so-called lateral electric field. Note that meaning of the term "parallel" above includes "substantially parallel".

In the present embodiment, the substrate 10 includes the glass substrate 11, and the substrate 20 includes the glass substrate 21. On the glass substrate 11 of the substrate 10, a pair of comb electrodes 13 and 14 (pixel electrode and common electrode) is provided as the electric field application means.

The comb electrodes 13 and 14 may be made of a transparent electrode material such as ITO (Indium Tin Oxide) or metal such as aluminum. A material of the comb electrodes 13 and 14 are not specifically limited.

The alignment film 12 is provided so as to cover the comb electrodes 13 and 14. Note that a material of the alignment films 12 and 22 and a method of forming the alignment films 12 and 22 are not specifically limited. The alignment films 12 and 22 may be formed by, for example, applying a known alignment film material having a vertical alignment regulating function on the comb electrodes 13 and 14.

The electrode substrate and the counter substrate may be made of, for example, an array substrate such as a TFT array substrate and a color filter substrate. However, in the present embodiment, the electrode substrate and the counter substrate are not limited to these.

As shown in FIGS. 1 through 3, a polarizer 35 is provided on an opposite surface of the substrate 10 with respect to the surface which faces the liquid crystal layer 30, and a polarizer 36 is provided on an opposite surface of the substrate 20 with respect to the surface which surface faces the liquid crystal layer 30.

Further, as shown in FIG. 3, where necessary, a wave plate 37 is provided between the substrate 10 and the polarizer 35 and a wave plate 38 is provided between the substrate 20 and the polarizer 36. Note that the wave plate 37 or 38 may be provided only to one surface of the liquid crystal panel 2. In the case of a display device utilizing only transmitted light from a front surface, the wave plates 37 and 38 are dispensable.

A liquid crystal cell 5 of the liquid crystal panel 2 is formed by, for example, as shown in FIG. 2, (i) bonding the substrate 10 to the substrate 20 via a spacer 33 by use of a sealing agent 34 and (ii) filling and sealing a medium containing the p-type liquid crystal material as a liquid crystal material in a space between the substrates 10 and 20. An example of the p-type liquid crystal material is a p-type nematic liquid crystal material.

The liquid crystal panel 2 is formed by bonding, to the liquid crystal cell 5, the wave plates 37 and 38 and the polarizers 35 and 36 as described above.

Figure 4:
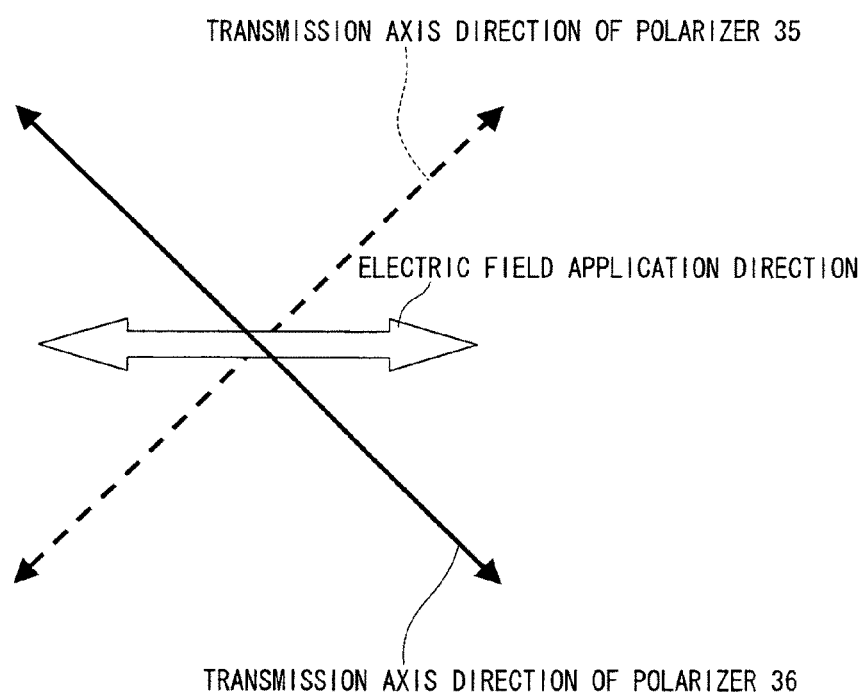
FIG. 4 is a diagram illustrating a relation between transmission axis directions of polarizers and an electric field application direction in the liquid crystal panel shown in FIG. 1.

FIG. 4 shows a relation of transmission axis directions of the polarizers 35 and 36 and an electric field application direction. As shown in FIG. 4, the polarizers 35 and 36 are provided so that the transmission axis directions of the polarizers 35 and 36 are orthogonal and an angle between each of the transmission axis directions and the electric field application direction is 45 degrees.

Next, a display mode (hereinafter, referred to as a "present mode") of the liquid crystal panel 2 is explained.

Figure 5A:
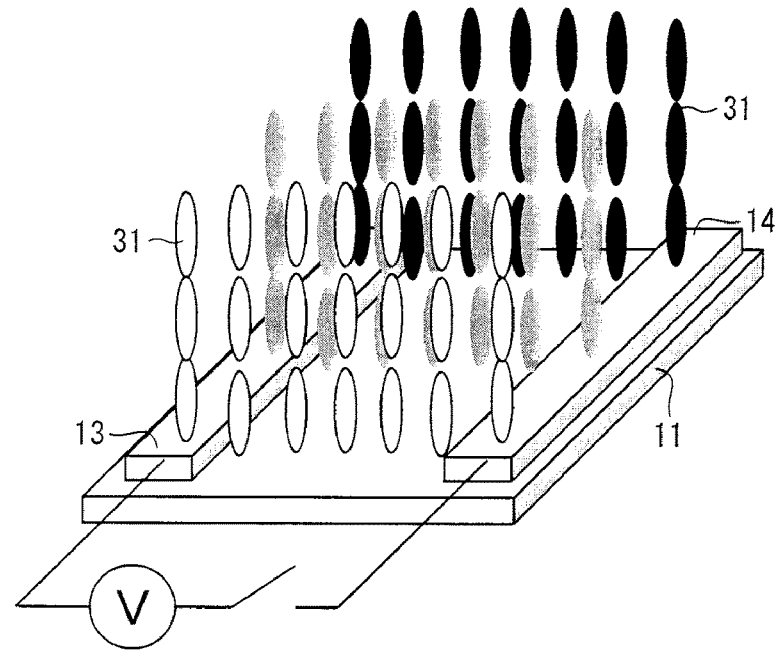
FIG. 5(a) is a perspective view of a substantial part of the liquid crystal panel at the time when no electric field is applied, illustrating a state of rotation of p-type liquid crystal molecules in the liquid crystal panel shown in FIG. 1.
Figure 5B:
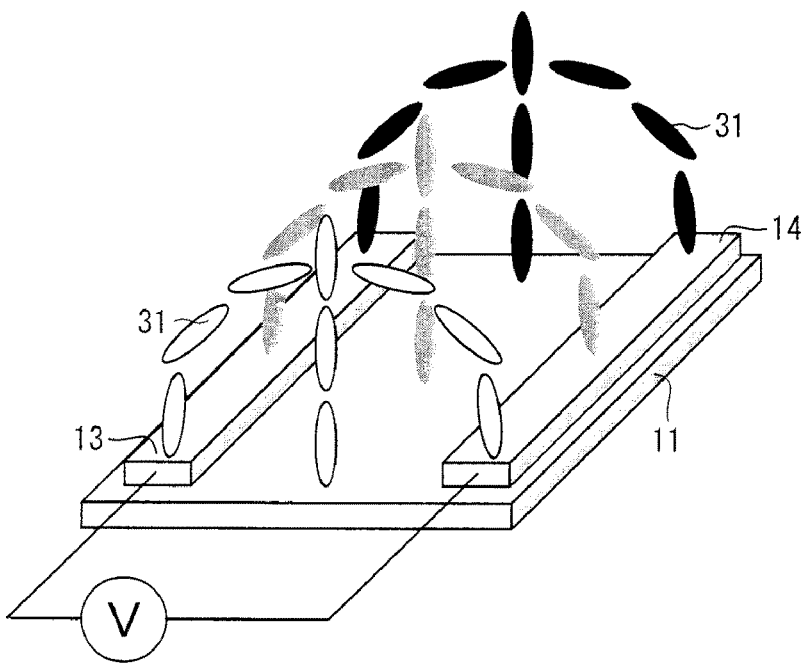
FIG. 5(b) is a perspective view of the substantial part of the liquid crystal at the time when an electric field is applied, illustrating a state of rotation of p-type liquid crystal molecules in the liquid crystal panel shown in FIG. 1.

FIGS. 5(*a*) and 5(*b*) show, by directions of liquid crystal directors, states of rotation of the p-type liquid crystal molecules 31 due to electric field application. FIG. 5(*a*) is a perspective view of a substantial part of the liquid crystal panel 2 at the time when no electric field is applied. FIG. 5(*b*) is a perspective view of the substantial part of the liquid crystal at the time when an electric field is applied.

The present mode, as described above, is one type of display modes according to which an electric field parallel to the substrate surface is applied by use of the comb electrodes 13 and 14.

In the present mode, as shown in FIG. 5(*a*), when no electric field is applied, the p-type liquid crystal molecules 31 are aligned vertically with respect to the substrate surface. On the other hand, when an electric field is applied, an electric flux line is bent so as to form a semicircle. Accordingly, as illustrated in FIG. 5(*b*), the p-type liquid crystal molecules 31 are arranged, in bend alignment, in an arc in a substrate thickness direction. As a result, the p-type liquid crystal molecules 31 show birefringence with respect to light traveling in a direction perpendicular to the substrate surface.

In this mode, while a high contrast due to the vertical alignment is maintained, driving with the use of a lateral electric field is carried out so that a direction in which the p-type liquid crystal molecules 31 are aligned is defined. Accordingly, it is not necessary to control alignment by using a rib as in an MVA mode. Further, the present mode has an excellent viewing angle characteristic in a simple pixel configuration.

Further, because the driving with the use of the lateral electric field is carried out by using the p-type liquid crystal material in the vertical alignment mode as described above, a bent electric filed (an arc electric field) is formed due to electric field application and two domains having director directions different by 180 degrees from each other are formed. As a result, a wide viewing angle characteristic can be obtained.

The present invention is achieved based on the finding that a degree of bend alignment can be controlled unconstrainedly by changing a panel configuration and physical properties of a liquid crystal material to be used. The "degree of the bend alignment" means how much the p-type liquid crystal molecules 31 arranged in the bend alignment as shown in FIG. 5(*b*) are bent (hereinafter, referred to as a "curvature").

According to the present invention, the degree of bend alignment can be increased so that a high light transmittance can be obtained. Further, according to the present invention, because, as described above, the degree of bend alignment can be controlled unconstrainedly, a high-speed response characteristic can be achieved by utilizing a flow effect as in an OCB mode. Accordingly, the present invention has a very high practical value.

In the OCB mode, transition from splay alignment to bend alignment occurs at a voltage a little higher than a critical driving voltage. The bend alignment at this time shows a maximum curvature. Therefore, in the OCB mode, gray scale display is carried out between the bend alignment showing the maximum curvature and bend alignment having gentle bending at the time when a high voltage is applied.

Meanwhile, in the present mode, gray scale display is carried out between (i) bend alignment having a large curvature at the time when a high voltage is applied and (ii) vertical alignment at the time when no voltage is applied. In this case, the maximum curvature depends on an applied voltage. The larger the electric field intensity becomes, the larger the maximum curvature becomes. That is, the degree of bend alignment and the maximum curvature can be controlled unconstrainedly through an electrode width L, an electrode spacing (distance between electrodes) S, and a cell gap (layer thickness of the liquid crystal material, thickness of the liquid crystal layer 30) d. As a result, the present mode can have a maximum curvature equal to or larger than that of the OCB mode. This makes it possible to achieve a high-speed response that is equal to or faster than that of the OCB mode.

Figure 6:
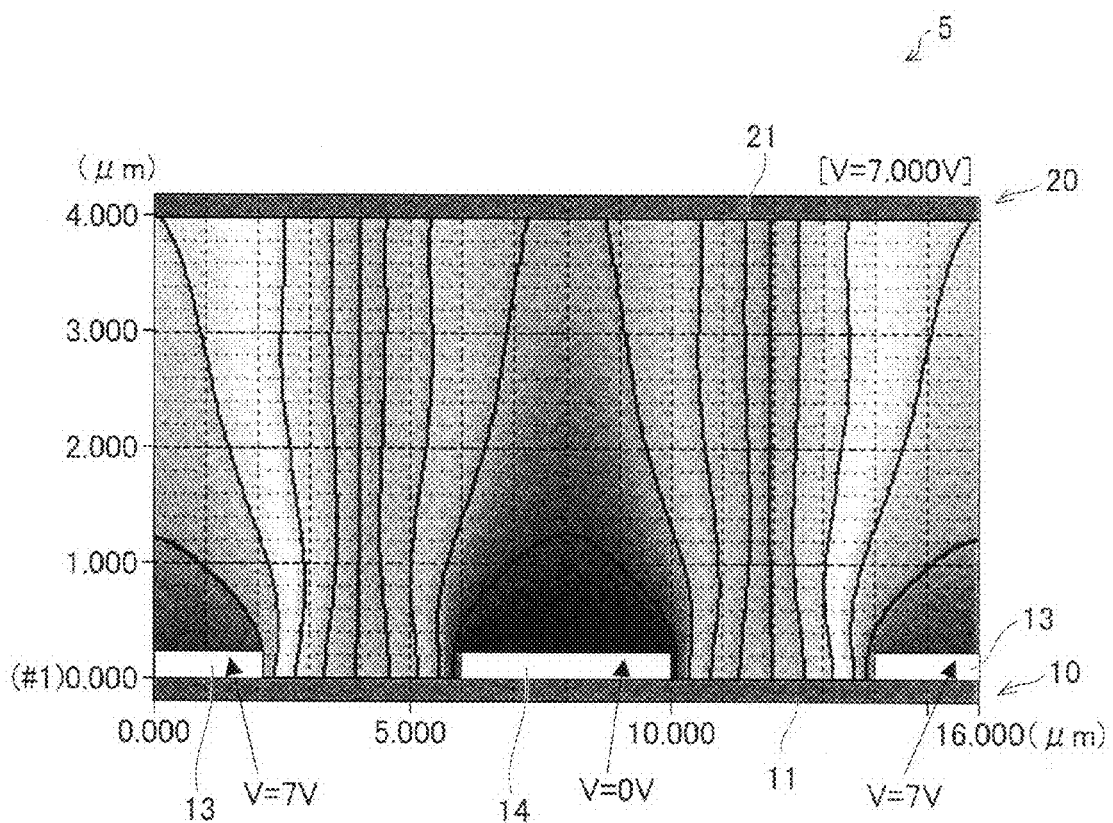
FIG. 6 is a graph showing equipotential curves of a liquid crystal cell according to one embodiment of the present invention.

FIG. 6 shows equipotential curves of the liquid crystal cell 5 at the time when a voltage of 7V is applied to the liquid crystal cell 5. The liquid crystal cell 5 has an electrode width L of 3 μm and an electrode spacing S of 4 μm of the comb-teeth shape electrodes 13 and 14, and a cell gap d of 4 μm. That is, FIG. 6 shows equipotential curves of the liquid crystal cell 5 at the time when the voltage (rectangular pulse) of 7V is applied between the comb-teeth shape electrodes 13 and 14.

Figure 7:
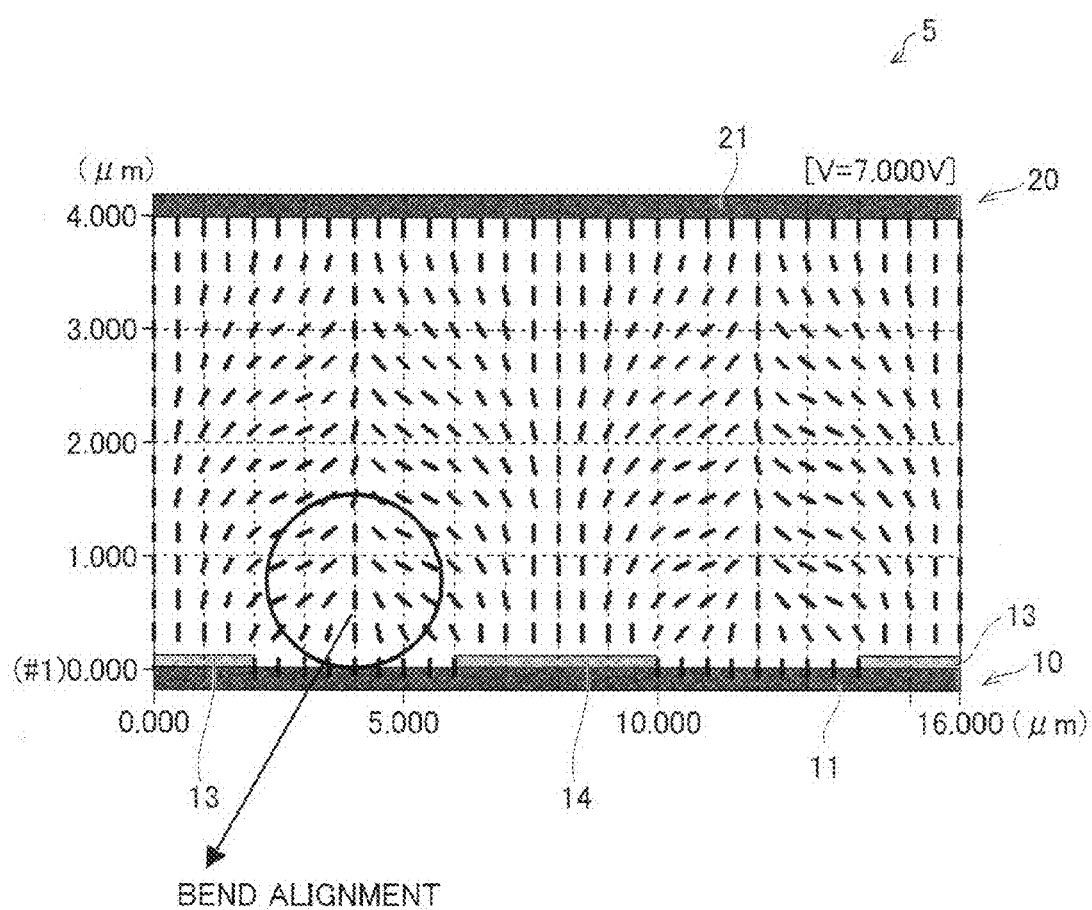
FIG. 7 is a diagram illustrating director distribution of p-type liquid crystal molecules in the liquid crystal cell shown in FIG. 6.

In this case, the p-type liquid crystal molecules 31 are aligned in accordance with binding force from an interface and electric field intensity distribution shown by the equipotential curves. FIG. 7 shows director distribution of the p-type liquid crystal molecules 31 in the liquid crystal cell 5 in this case. Due to voltage application, the liquid crystal molecules 31 continuously transit from the homeotropic alignment to the bend alignment. That is, in normal driving, a liquid crystal layer 30 always exhibits the bend alignment and a high-speed response can be achieved in a response from gray scale level to another gray scale level.

Further, FIG. 7 illustrates that, in a region where the comb-teeth shape electrodes 13 and 14 are not present rather than a region above the comb-teeth shape electrodes 13 and 14, a degree of bend distortion is greater and an optical modulation factor is larger. The following examines this in more detail.

Figure 8:
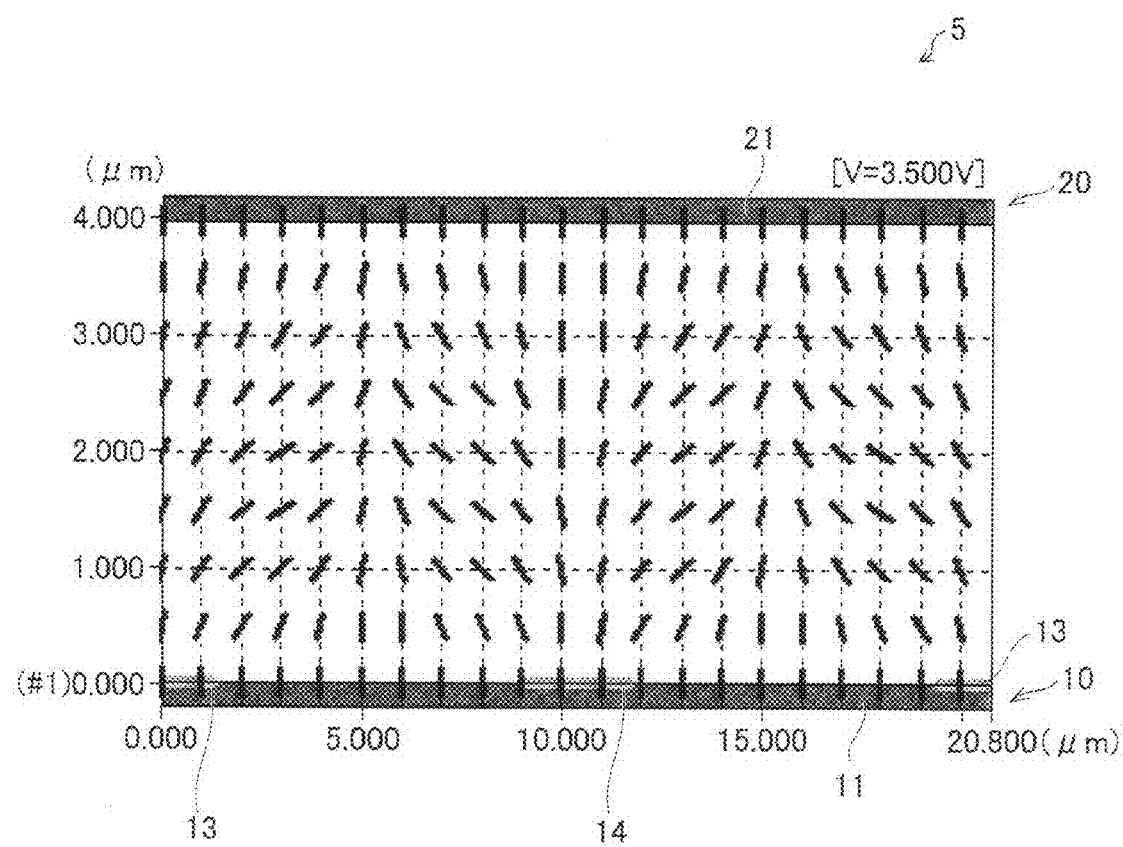
FIG. 8 is a diagram illustrating director distribution of p-type liquid crystal molecules in the liquid crystal cell according to one embodiment of the present invention.

FIG. 8 illustrates director distribution of the liquid crystal cell 5 at the time when a voltage of 3.5V is applied to the liquid crystal cell 5. The liquid crystal cell 5 has an electrode width L of 2.6 µm and an electrode spacing S of 7.8 µm of the comb-teeth shape electrodes 13 and 14, and a cell gap d of 4 µm. Note that the p-type liquid crystal material that is used has a dielectric constant anisotropy ($\Delta\epsilon$) of 20.8 and a refractive index anisotropy ($\Delta n$) of 0.14.

The present mode is significantly different from other display modes such as an IPS mode and the OCB mode according to each of which an electric field parallel to a substrate surface is applied. The difference is such that, as shown in FIG. 8, in the present mode, the p-type liquid crystal molecules 31 are always vertically aligned in regions at a center of each electrode and at a center between electrodes.

Figure 9:
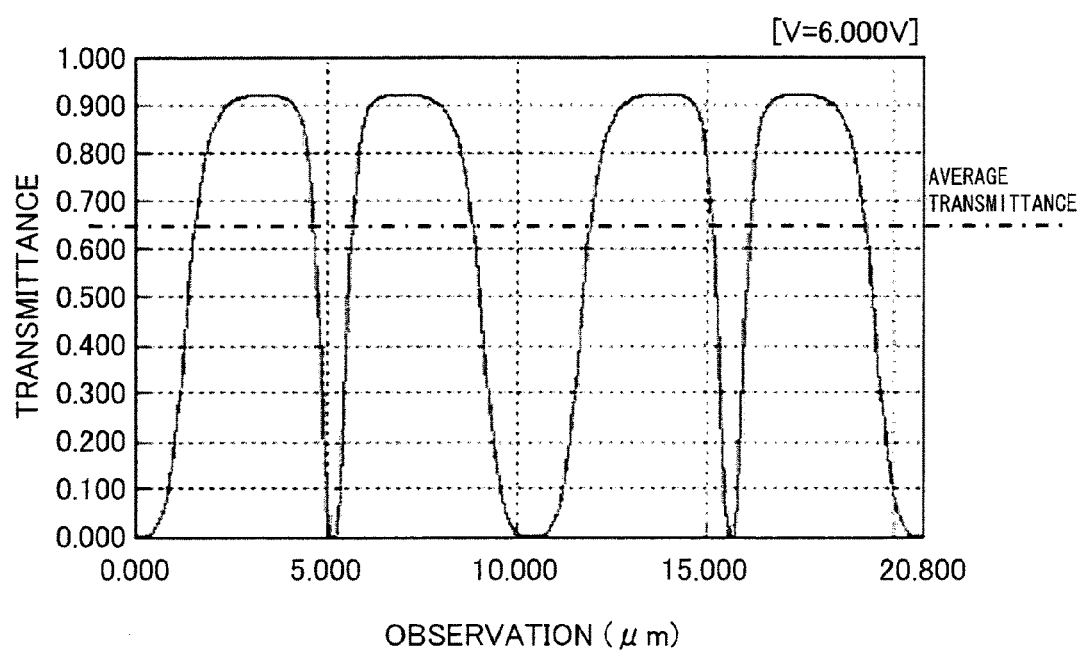
FIG. 9 is a graph illustrating transmittance distribution in the liquid crystal cell used in FIG. 8.

FIG. 9 illustrates transmittance distribution in the liquid crystal cell 5 at the time when a voltage of 6V is applied to the liquid crystal cell 5 used in FIG. 8. FIG. 9 illustrates the transmittance distribution in a region corresponding to the region shown in FIG. 8. Note that each of diagrams and tables below shows transmittance on an assumption that a transmittance of 100% is an optical transmittance of the liquid crystal panel 2 at the time when no voltage is applied and that the transmittance of 100% is 1 (reference).

As shown in FIG. 9, a transmittance of 90% or more can be obtained depending on a position in the liquid crystal cell 5. However, light does not transmit through regions at the center of each electrode and at the center between electrodes. Therefore, the liquid crystal cell 5 as a whole provides a transmittance of only 65% approximately.

Figure 10:
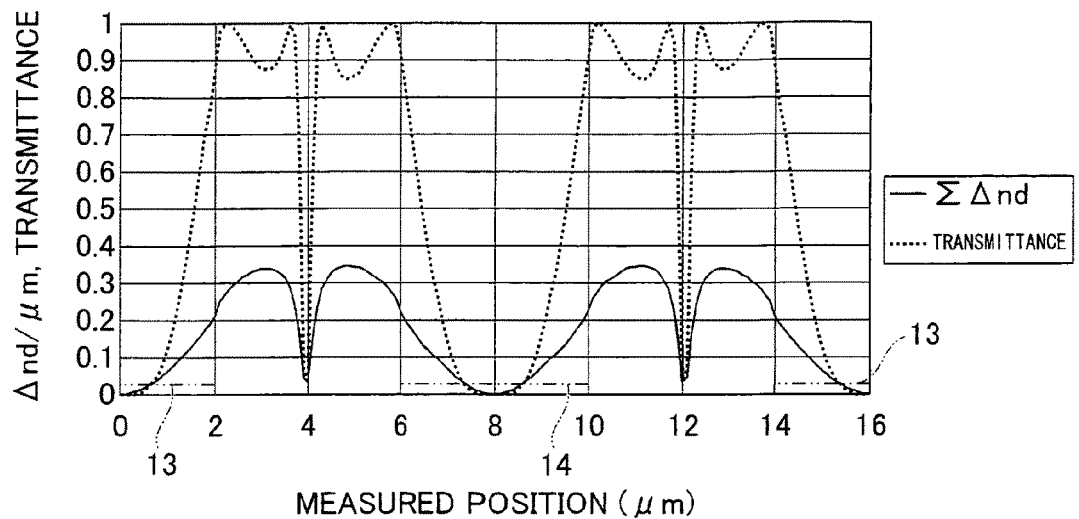
FIG. 10 is a graph illustrating transmittance distribution and phase difference distribution in a liquid crystal cell according to one embodiment of the present invention.
Figure 11:
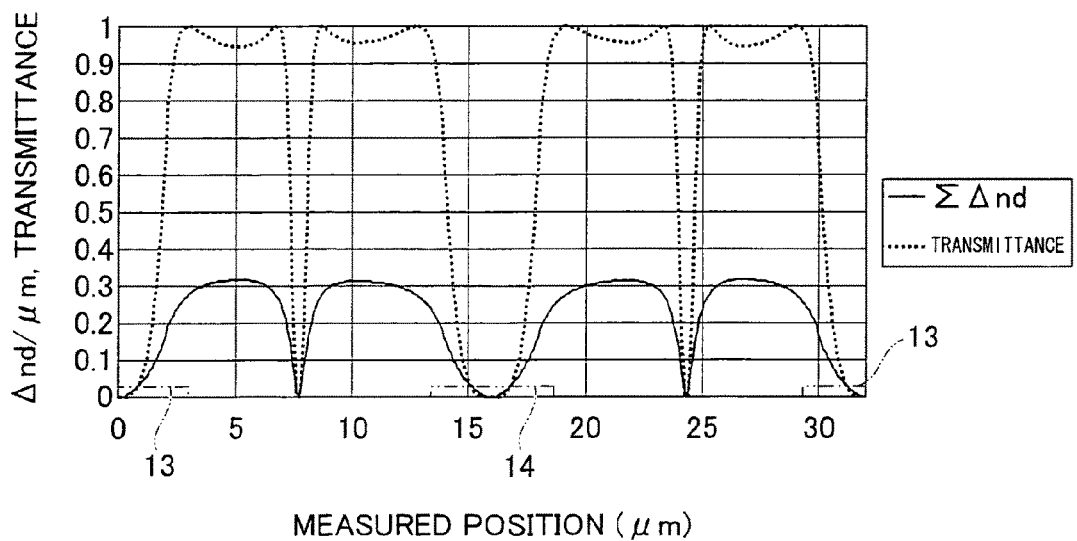
FIG. 11 is a graph illustrating transmittance distribution and phase difference distribution in a liquid crystal cell that has a different interval between electrodes from that of the liquid crystal cell shown in FIG. 10.

FIG. 10 is a graph illustrating transmittance distribution and phase difference distribution within the liquid crystal cell 5 at the time when an electric field is applied to the liquid crystal cell 5 that has an electrode width L of 4 µm, an electrode spacing S of 4 µm and a cell gap d of 4 µm, and that employs, as the p-type liquid crystal material, "MLC-6262" (Product Name, produced by Merck Ltd., $\Delta\epsilon$=18.5 and $\Delta n$=0.1450). FIG. 11 is a graph illustrating transmittance distribution and phase difference distribution in the liquid crystal cell 5 which are measured under the same condition as the case in FIG. 10 except that the electrode spacing S is 12 µm.

Note that light for measurement used in the measurement above has a wavelength of 550 nm, and a voltage of 12 V is applied between the comb-teeth shape electrodes 13 and 14. Positions of the comb-teeth electrodes 13 and 14 with respect to a position for measurement are shown by a chain double-dashed line.

As shown in FIGS. 10 and 11, due to voltage application, a phase difference ($\Delta$nd) becomes large and a transmittance also increases. However, the transmittance decreases at a part where the phase difference is more than $\lambda/2$ (corresponding to 275 nm in the present measurement).

This result shows that, though the phase difference needs to be increased by applying a voltage for increasing the transmittance, a phase difference increased too much exceeds $\lambda/2$, which rather decreases the transmittance.

The phase difference occurs due to rotation of the liquid crystal molecules due to voltage application. However, there is an optimum range for the phase difference as described above. This indicates that physical properties (specifically, $\Delta\epsilon$ and $\Delta n$) of liquid crystal also have respective optimum ranges.

It is clear from comparison of FIGS. 10 and 11 that the light transmittance improves as a result of increasing the electrode spacing S. However, because the electric field intensity is decreased, a response characteristic deteriorates. Because the present mode itself is a high-speed display mode, for practical use, a balance between the response characteristic and the transmittance needs to be considered when the electrode width L and the electrode spacing S are determined. The following specifically verifies this with Examples.

Example 1

First, an alignment film material "JALS-204" (Product Name, 5% by weight (solid content), γ-butyrolactone solution, produced by JSR Corporation) was applied, by a spin coat method, on a glass substrate that was provided with comb-teeth electrodes 13 and which were made of ITO and that had an electrode width L of 4 µm, an electrode spacing S of 4 µm, and an electrode thickness of 1000 Å. Then, the glass substrate with the alignment film material was baked at 200° C. for 2 hours so as to form a substrate 10. A thickness of an alignment film 12 obtained was 600 Å (60 nm).

Next, an alignment film 22 that was identical to the alignment film 12 was formed on a glass substrate 22 so as to form a substrate 20 in the same manner as the substrate 10 except that the comb-teeth shape electrodes 13 and 14 were not provided on the glass substrate 21.

Subsequently, on the substrate 10, resin beads "Micropearl SP" (Product Name, manufactured by Sekisui Chemical Co. Ltd.), as a spacer 33, that had a diameter of 4 µm were dispersed. Meanwhile, on the substrate 20, a sealing resin "Struct Bond XN-21-S" (Product Name, produced by Mitsui Toatsu Chemicals, Inc.), as a sealing agent 34, was printed.

Next, the substrates 10 and 20 were bonded and baked at 250° C. for 3 hours so as to fabricate a liquid crystal cell 5.

Then, in the liquid crystal cell 5, "ZLI-2293" (Product Name, manufactured by Merck Ltd., p-type nematic liquid crystal material, $\Delta\epsilon$=10 and $\Delta n$=0.136) as a liquid crystal material was filled and sealed by a vacuum filling method so as to form a liquid crystal layer 30. Subsequently, the polarizers 35 and 36 were bonded to front and back surfaces of the liquid crystal cell 5 so as to fabricate a liquid crystal panel 2 that had a configuration as shown in FIG. 2. A relation between an electric field application direction and transmission axis directions of the polarizers 35 and 36 at this time is as shown in FIG. 4.

Figure 12:
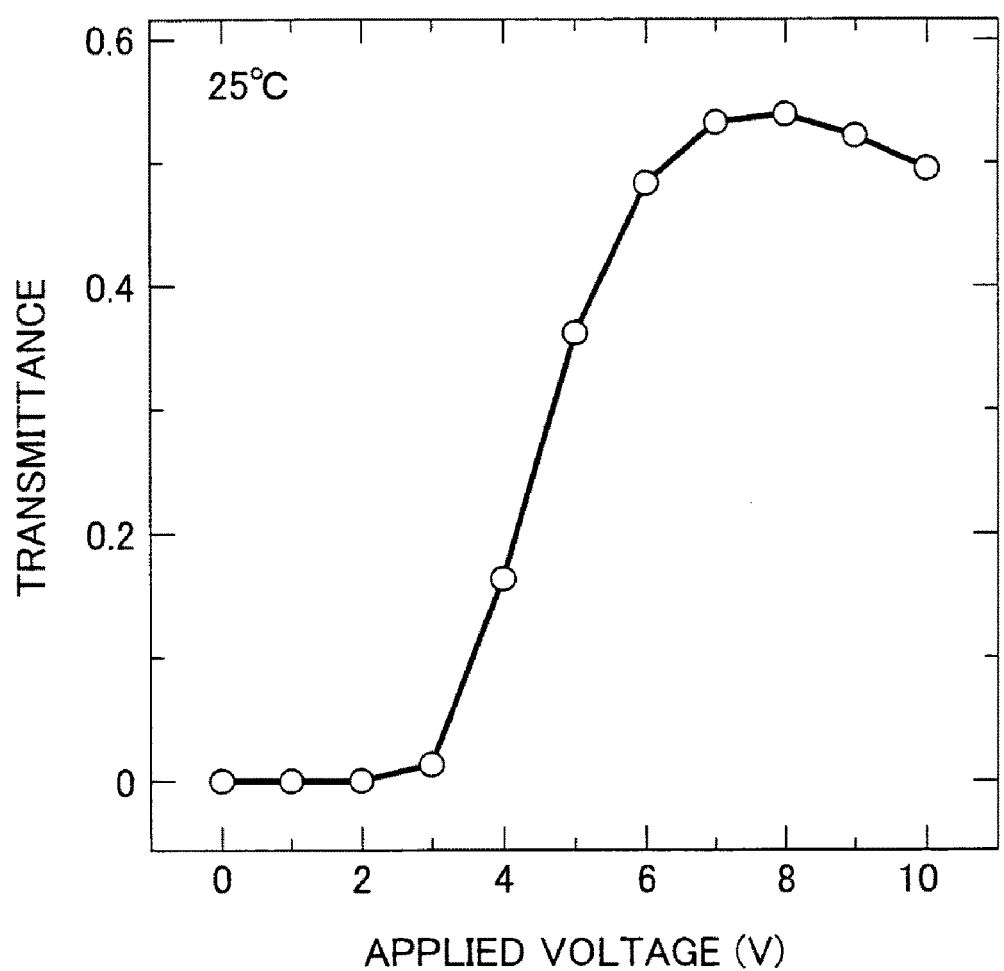
FIG. 12 is a graph illustrating a voltage-transmittance characteristic of a liquid crystal panel fabricated in Example 1.

FIG. 12 shows a voltage-transmittance characteristic of thus fabricated liquid crystal panel 2., at a room temperature (25° C.).

It is clear from FIG. 12 that the maximum transmittance (Tmax) of the liquid crystal panel 2 was higher than 0.5 (i.e., 50%) and transmittance could be significantly improved by using a practical driving voltage, as compared with conventional techniques (e.g., Patent Document 4).

That is, the technique of Patent Document 4 can provide only a degree of transmittance (transmittance) of approximately 14%, for example, at 40V (Refer to FIG. 10 of Patent Document 4). Meanwhile, the liquid crystal panel 2 can provide a transmittance of approximately 50% at approximately 6V to 10V and the maximum transmittance (Tmax) higher than 50% at approximately 7V to 8V.

As described above, in driving by use of a lateral electric field, a driving voltage of 6V to 7V is typically used at present. When the driving voltage becomes more than 9V, a driver having a high withstand voltage is required. Therefore, for practical use, the driving voltage is preferably less than 9V, and more preferably 7V or less. In the present embodiment, a high light transmittance can be obtained at a practical driving voltage. Accordingly, the driving voltage preferably is approximately 6V to 7V, in the present embodiment.

Note that, unless a temperature is particularly specified, the following measurement was carried out at a room temperature (25° C.). When the maximum transmittance Tmax is shown, a response time indicates a response time at a driving voltage (substantially 7V) where the maximum transmittance Tmax occurred as described later; otherwise, in view of the maximum transmittance, a driving voltage of 7V was applied.

In the liquid crystal panel 2, basically, alignment control is unnecessary and therefore ribs conventionally used in, for example, the MVA mode that is the same vertical alignment mode, are not required. Therefore, an aperture ratio can be improved.

Figure 13:
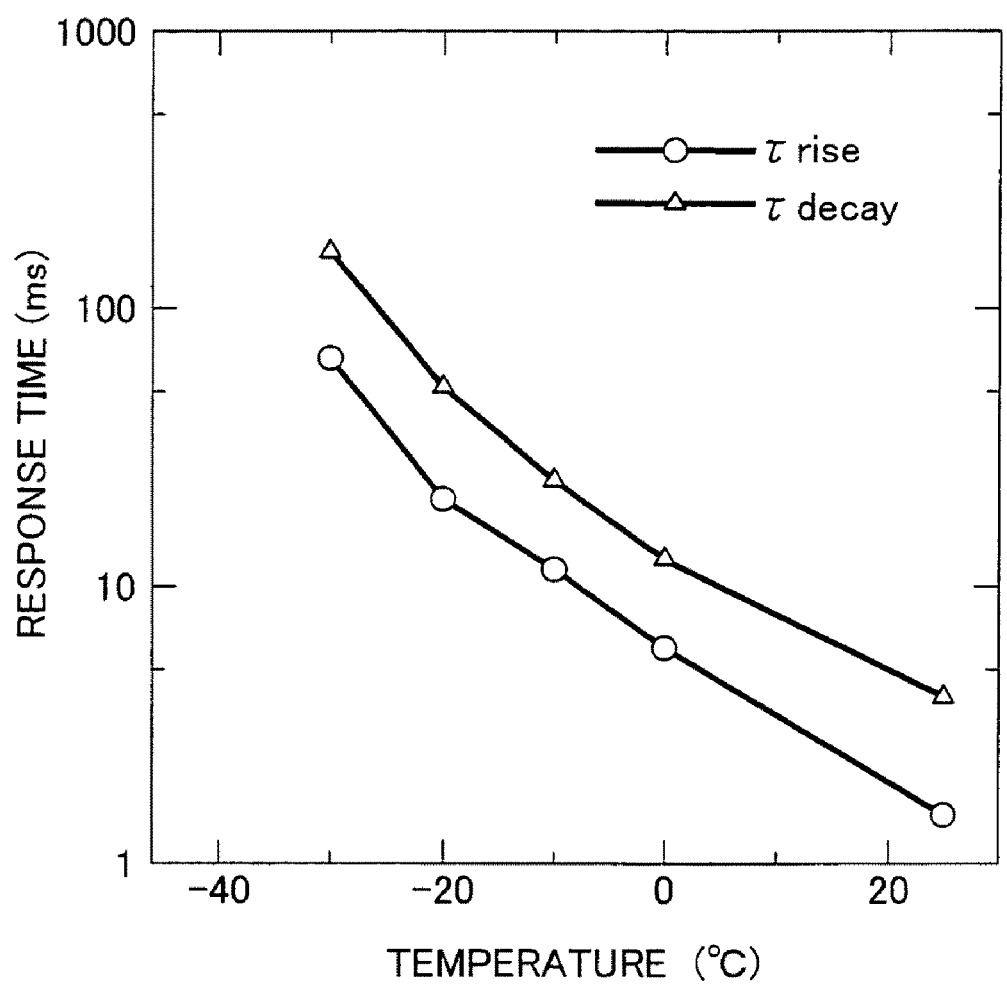
FIG. 13 is a graph illustrating temperature dependency of a response characteristic of the liquid crystal panel fabricated in Example 1.

FIG. 13 shows temperature dependency of response characteristic at the time when a voltage of 7V is applied to the liquid crystal panel 2. Note that, in FIG. 13, τ rise shows a rise and τ decay shows a decay.

As shown in FIG. 13, the liquid crystal panel 2 shows a high-speed response even at a low temperature. Therefore, the liquid crystal panel has a very high practical value.

The following explains why the liquid crystal panel 2 shows a high-speed response.

Figure 14:
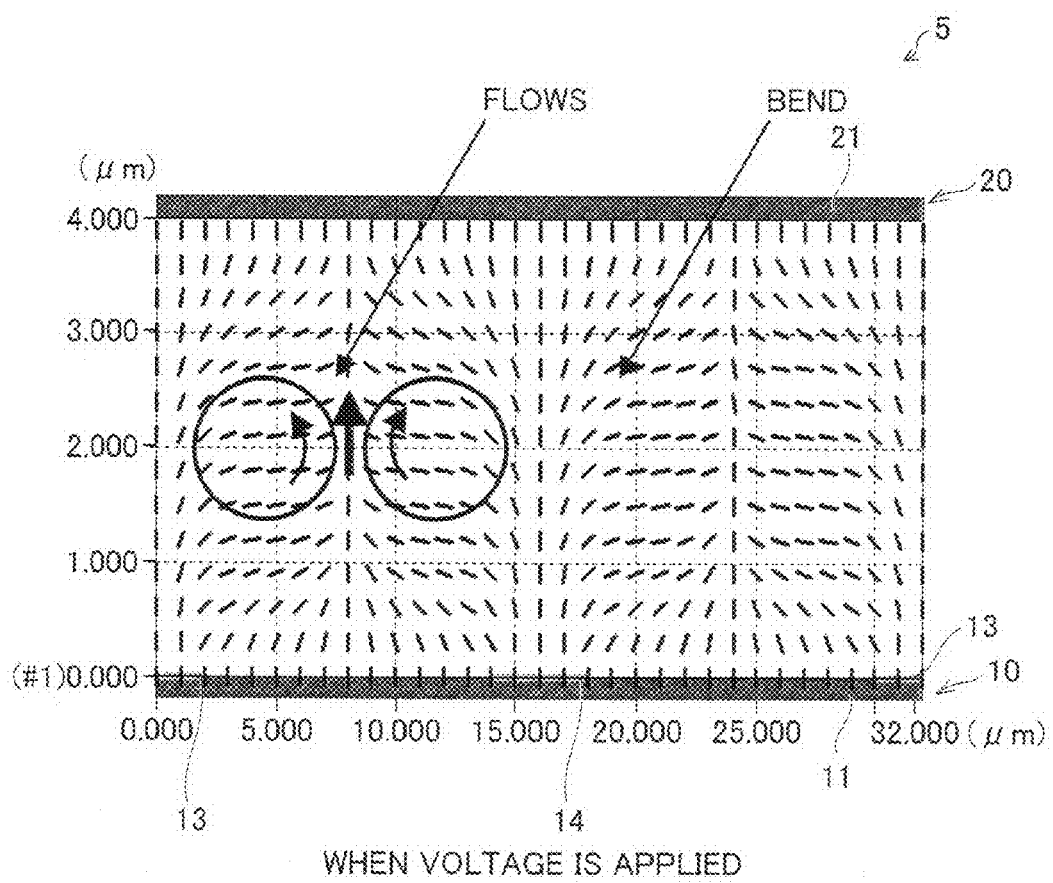
FIG. 14 is a diagram showing flows of liquid crystal molecules in a liquid crystal layer in the liquid crystal panel fabricated in Example 1.

When a lateral electric field is applied to the liquid crystal material by the comb-teeth shape electrodes 13 and 14, rotation and bend distortion occur in the liquid crystal material. At this time, as shown in FIG. 14, flows of liquid crystal molecules occur in the liquid crystal layer 30. In the flows, rotations symmetrical with respect to a disclination line occur and a direction of the rotation on one side of the disclination line is opposite to a direction of the rotation on the other side. As a result, torque in an identical direction operates in the vicinity of the disclination line.

That is, unlike in the TN mod and the MVA mode, each flow in the liquid crystal layer does not hamper another flow. Rather, as shown in FIG. 14, as in the OCB mode, the flows of the liquid crystal molecules occur in a direction assisting movement of the liquid crystal molecules when the liquid crystal molecules are to move. This makes it possible to achieve a high-speed response.

Such a high-speed response characteristic corresponds to the decree of bending (curvature). This degree of bending depends on physical properties (a product of dielectric constant anisotropy Δε and a refractive index anisotropy Δn, and an elastic constant k33) of the liquid crystal material. Further, the degree of bending also varies in accordance with the electrode width L or the electrode spacing S of the comb-teeth shape electrodes 13 and 14, or the cell gap d.

In other words, according to the liquid crystal panel 2, the degree of bending can be controlled unconstrainedly through distribution of the electric field intensity in the liquid crystal cell 5 and a high-speed response as fast as or faster than that of the OCB mode can be achieved.

Moreover, in display principle, it is possible to achieve a wide viewing angle characteristic equivalent to that of the IPS mode.

Example 2

Forty liquid crystal panels 2 each having the configuration as shown in FIG. 2 were fabricated in the same manner as Example 1 except that "MLC-6269-000" (Product Name, manufactured by Merck Ltd., p-type nematic liquid crystal material, Δε=17.7 and Δn=0.0984) was used as the liquid crystal material and the electrode width L, the electrode spacing S, and the cell gap d were variously changed.

Next, at 25° C., while an applied voltage was varied from 0V to 20V, a voltage-transmittance characteristic of each of the liquid crystal panels 2 was measured. In the measurement, a rectangular wave of 30 Hz was applied and a wavelength of light for measurement was 550 nm. A relation of the electric application direction and the transmission axis directions of the polarizers 35 and 36 at that time was as shown in FIG. 4. Table 1 shows all relations of the electrode width L, the electrode spacing S, and the maximum transmittance Tmax of the liquid crystal panels 2 each having the cell gap d of 4 μm. Table 2 shows all relations of the electrode width L, the electrode spacing S, and the maximum transmittance Tmax of the liquid crystal panels 2 each having the cell gap d of 6 μm.

TABLE 1

| Cell Gap | | Electrode Spacing | | | |
|---|---|---|---|---|---|
| (4 μm) | | 5 μm | 10 μm | 15 μm | 20 μm |
| Electrode Width | 2 μm | 0.573 | 0.647 | 0.611 | 0.490 |
| | 3 μm | 0.542 | 0.633 | 0.588 | 0.486 |
| | 5 μm | 0.512 | 0.576 | 0.537 | 0.487 |
| | 6 μm | 0.478 | 0.533 | 0.488 | 0.447 |
| | 8 μm | 0.456 | 0.515 | 0.431 | 0.422 |

TABLE 2

| Cell Gap | | Electrode Spacing | | | |
|---|---|---|---|---|---|
| (6 μm) | | 5 μm | 10 μm | 15 μm | 20 μm |
| Electrode Width | 2 μm | 0.537 | 0.576 | 0.566 | 0.491 |
| | 3 μm | 0.519 | 0.563 | 0.603 | 0.481 |
| | 5 μm | 0.501 | 0.527 | 0.571 | 0.495 |
| | 6 μm | 0.500 | 0.511 | 0.556 | 0.474 |
| | 8 μm | 0.457 | 0.481 | 0.428 | 0.396 |

It is clear from results as shown in Tables 1 and 2 that, the smaller the electrode width L of the comb-teeth electrodes 13 and 14 becomes and the larger the electrode spacing S becomes, the larger the maximum transmittance Tmax becomes. Moreover, as the cell gap d (more precisely, a phase difference Δnd of the liquid crystal cell 5) becomes larger, the maximum transmittance Tmax tends to become larger. However, the phase difference distribution exists within a plane of the liquid crystal cell 5, as described above, and the transmittance rather deteriorates as the cell gap d increases in a region where Δnd exceeds a half wavelength. Therefore, the transmittance of the entire liquid crystal cell 5 is not always correlated to a liquid crystal cell thickness.

Further, it is clear from Tables 1 and 2 that a high transmittance is obtainable when the electrode width L is 5 μm or less and the electrode spacing S is 15 μm or less. Note that, in view of panel production, each of the electrode width L and the electrode spacing S is preferably at least 2 μm.

Example 3

Nine liquid crystal panels 2 each having the configuration as shown in FIG. 2 were fabricated in the same manner as Example 1 except that (i) liquid crystal cells 5 each having the electrode width L of 4 μm, the electrode spacing S of 6 μm, and the cell gap d of 4 μm were used and (ii) various liquid crystal materials each having a different dielectric constant anisotropy Δε or refractive index anisotropy Δn were used as the liquid crystal materials. Table 3 shows all relations of the maximum transmittance Tmax, the decay response time (τ decay) at the maximum transmittance Tmax, and a product Δε·Δn of the dielectric constant anisotropy Δε and the refractive index anisotropy Δn.

TABLE 3

| Δε · Δn | Tmax | τ decay (ms) |
|---|---|---|
| 1.16 | 0.47 | 7.8 |
| 1.3 | 0.61 | 3.5 |
| 1.68 | 0.62 | 4.2 |
| 2.02 | 0.64 | 3.6 |
| 2.68 | 0.55 | 3.8 |
| 3.12 | 0.57 | 4 |
| 3.23 | 0.55 | 8.5 |
| 3.52 | 0.5 | 11.2 |
| 4.21 | 0.46 | 4.1 |

It is clear from a result shown in Table 3 that a high transmittance and a high-speed response can be practically obtained when Δε·Δn is in a range of 1.3 to 3.1. It is also clear that, when Δε·Δn becomes larger than 3.1, a phase difference in a region in which a change in phase difference is large in the liquid crystal cell 5 becomes larger than a half wavelength, and consequently, the transmittance adversely becomes smaller.

Example 4

Ten liquid crystal panels 2 each having the configuration as shown in FIG. 2 were fabricated in the same manner as Example 1 except for (i) using, as the liquid crystal material, 5CB (4'-cyano-4-pentylbiphenyl, p-type nematic liquid crystal material, Δε=13.2 and Δn=0.189) or a mixture (hereinafter referred to as "mixture A"; p-type nematic liquid crystal material, Δε=17.6 and Δn=0.098) of 91.7 parts by weight of "MLC-6269-000" (Product Name, manufactured by Merck Ltd.) and 8.3 parts by weight of "MLC-6267-000" (Product Name, manufactured by Merck Ltd.), (ii) having the electrode width L of 4 μm, the electrode spacing S of 6 μm, and variously changed cell gaps d. Table 4 shows the maximum transmittance Tmax of the liquid crystal panels 2 and a decay response time at the maximum transmittance Tmax. Note that the decay response time was defined as a time required for changing transmitted light intensity by 90%, at the time when an applied voltage was changed so that a state of V50 (a voltage value indicative of a transmittance of 50% in a case where the minimum and maximum transmittances were standardized as 0% and 100%) is changed to a state of no voltage application.

TABLE 4

| Liquid Crystal Material | Cell Gap (μm) | Δnd (μm) | Tmax | τ decay (ms) |
|---|---|---|---|---|
| Mixture A | 2.5 | 0.245 | 0.38 | 3.2 |
| | 3.1 | 0.304 | 0.51 | 3.3 |
| | 3.2 | 0.315 | 0.536 | 3.3 |
| | 4 | 0.392 | 0.67 | 3.6 |
| | 5 | 0.49 | 0.63 | 3.5 |
| 5CB | 3 | 0.567 | 0.61 | 3.8 |
| | 3.5 | 0.662 | 0.55 | 3.9 |
| | 3.7 | 0.699 | 0.51 | 3.9 |
| | 3.8 | 0.718 | 0.48 | 3.9 |
| | 4 | 0.756 | 0.46 | 4.1 |

It is clear from Table 4 that a high transmittance and a high-speed response are obtainable when a product Δnd (phase difference) of the refractive index anisotropy Δn of the liquid crystal material used and the cell gap d is in a range of 0.3 to 0.7.

It is also clear from the result above that the electrode width of each of the comb-teeth shape electrodes 13 and 14 is preferably 5 μm or less and the electrode spacing of the comb-teeth shape electrodes 13 and 14 is preferably 15 μm or less. Further, the liquid crystal material preferably has Δε·Δn in a range of 1.3 to 3.1. In addition, it is clear from the result that Δnd is more preferably in a range of 0.3 μm to 0.7 μm.

Note that a general p-type liquid crystal has Δε of approximately 4 to 9 and Δn of approximately 0.07 to 0.12. Conventionally, the dielectric constant anisotropy Δε and the refractive index anisotropy Δn are separately discussed and therefore the product Δε·Δn has not been discussed. In the present invention, it is found that the product Δε·Δn is related to the degree of bend alignment, and a high transmittance and a high-speed response can be achieved by optimizing the product Δε·Δn.

That is, the present invention provides the liquid crystal panel 2 and the liquid crystal display device 1 each of which has a higher degree of bending in liquid crystal alignment as compared with conventional configurations. As shown in Examples 1 through 4, the degree of bend alignment of the liquid crystal panel 2 can be controlled unconstrainedly by changing a panel configuration and physical properties of the liquid crystal material to be used.

Accordingly, as described above, a high optical transmittance can be obtained by setting the panel configuration and the physical properties of the liquid crystal material to be used within the above ranges.

The liquid crystal panel 2 can provide a high-speed response as fast as or faster than that of the OCB mode, by a particular bend alignment.

Note that, in the liquid crystal display device, regarding a rise, a high-speed response appears to be easily obtained by applying a voltage larger than a predetermined voltage as in an over drive method. However, because a decay depends only on the panel configuration, a low-viscosity liquid crystal material or a panel configuration that shows a high-speed response is important for a high-speed response in a decay.

As described above, in the liquid crystal panel 2, the liquid crystal layer 30 shows bend alignment and the response characteristic is not hampered by flows of the liquid crystal in a response to an electric field. Therefore, a high-speed response can be achieved.

Note that, though such bend alignment is used in the liquid crystal display device of the OCB mode, a transition operation from splay alignment that is initial alignment to bend alignment is required in the liquid crystal display device of the OCB mode every time a power supply is turned on. Therefore, improvement has been desired.

However, according to the liquid crystal panel 2, a circuit for initial alignment transition is unnecessary and cost reduction can be achieved. Further, defect in transition does not occur in an operation at a low temperature.

Therefore, according to the preset invention, it is possible to simultaneously achieve a wide viewing angle characteristic equivalent to that of the IPS mode and a high-speed response characteristic equivalent to or superior to that of the OCB mode. Further, it becomes possible to provide the liquid crystal panel 2 and the liquid crystal display device 1 for which an initial bend transition operation is not required.

Note that, in Example 4, 5CB is used solely as one liquid crystal material. 5CB is one kind of p-type nematic liquid crystals and a suitable material in terms of a material for measuring electro-optic characteristics. However, 5CB is not a practical material because 5CB exhibits a liquid crystal phase only at a temperature in a range of 22.5° C. to 35° C. Practically, it is desirable to use as the liquid crystal material a material that exhibits a liquid crystal phase at a temperature at least in a range of 0° C. to 60° C. Therefore, in a case where 5CB is used as the liquid crystal material, 5CB is preferably used in a mixture with another liquid crystal material so as to satisfy the aforesaid condition in addition to the conditions described above. Note that all of the liquid crystal materials used in Examples 1 to 4 described above and Examples 5 and 6 described later, except for 5CB solely used in Example 4, showed a liquid crystal phase at a temperature at least in the range of 0° C. to 60° C.

Further, the elastic constant k33 has been believed to be preferably small as much as possible, for bending liquid crystal alignment (easily forming bend alignment) (See Patent Document 4, for example.).

However, as a result of diligent studies of the inventors of the present application in view of increasing a curvature in bend alignment (increasing speed response), the inventors found that, for achieving the increased speed response, it is better that k33 is rather large. The following verifies this specifically by using Examples.

Example 5

Seven liquid crystal panels 2 each having the configuration as shown in FIG. 2 were fabricated in the same manner as Example 1 except for (i) using liquid crystal cells 5 each having the electrode width L of 4 μm, the electrode spacing S of 12 μm, and the cell gap d of 4 μm and (ii) filling and sealing, in the liquid crystal cells 5, a liquid crystal mixture of "5CB" and "ZLI-4792" (Product Name, produced by Merck Ltd.) for which proportions of the liquid crystal materials were variously changed.

Figure 15:
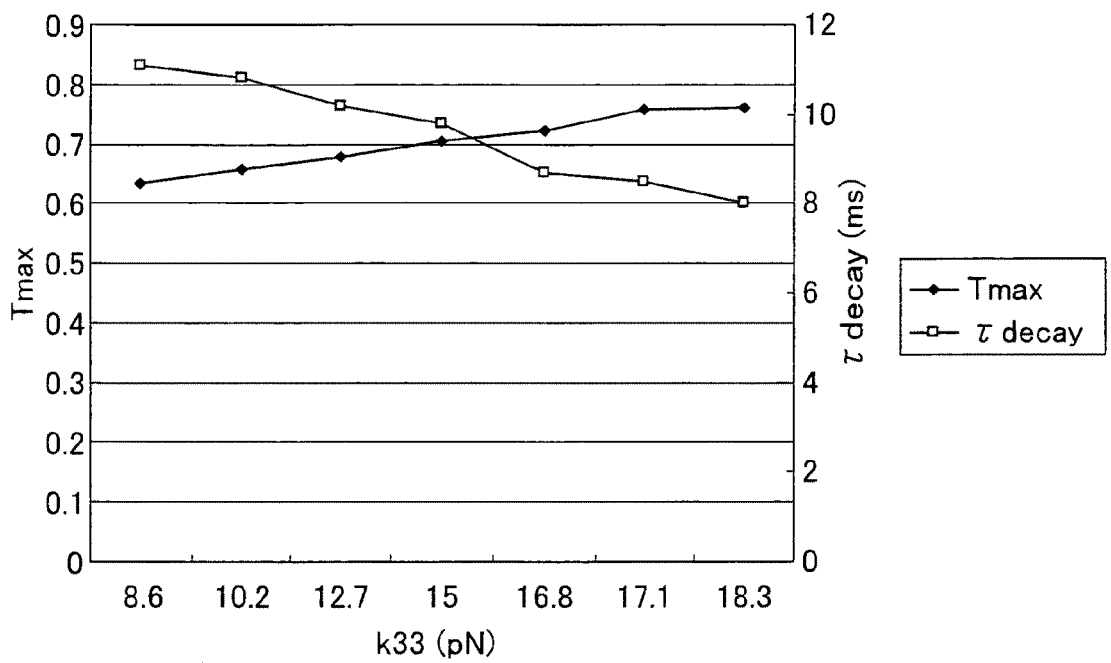
FIG. 15 is a graph illustrating a relationship between a maximum transmittance and a decay response time of a liquid crystal panel fabricated in Example 5.

Table 5 and FIG. 15 show all relations of the maximum transmittance Tmax, the decay response time τ decay at the maximum transmittance Tmax, and the elastic constant k33 of liquid crystal mixtures of the liquid crystal panels 2 at a room temperature.

TABLE 5

| k33 (pN) | Tmax | τ decay (ms) | Δε · Δn |
|---|---|---|---|
| 8.6 | 0.635 | 11.1 | 2.49 |
| 10.2 | 0.657 | 10.8 | 2.43 |
| 12.7 | 0.679 | 10.2 | 2.28 |
| 15 | 0.704 | 9.8 | 2.11 |
| 16.8 | 0.722 | 8.7 | 1.94 |
| 17.1 | 0.757 | 8.5 | 1.91 |
| 18.3 | 0.762 | 8 | 1.78 |

It is preferable to set the decay response time to approximately 10 ms or less, for completing a decay within one frame (16.6 ms). Based on this, it is clear from Table 5 that the liquid crystal panel 2 that has not only a high maximum transmittance Tmax but also a high response speed can be obtained by using a liquid crystal material that has the elastic constant k33 of 15 pN or more.

A reason for this is not clear, but it is inferred that a liquid crystal material having a large k33 has a large energy for distortion of the liquid crystal material due to electric field application, and this increases a speed of decay response.

In other words, in terms of τ decay, the larger the distortion is (the larger the k33 is), the faster the speed becomes. When k33 is small, molecular deformation occurs at a relatively low voltage. However, the maximum transmittance in consideration of a whole pixel becomes higher when k33 is larger.

In general, it is considered that, when k33 is smaller, the molecular distortion is larger and the transmittance becomes higher. However, in reality, the relation is in a reversed manner as described above as shown in Table 5 and FIG. 15. It is clear from the results that both the transmittance and the decay response speed can be satisfied by using the liquid crystal material having the elastic constant k33 of 15 pN or more.

Note that, as shown in Table 5 and FIG. 15, if the elastic constant k33 is 15 pN or more, a decay can be completed within one frame. Further, the larger the elastic constant k33 becomes, the higher the transmittance obtained becomes and the faster the decay response speed obtained becomes. Therefore, an upper limit of the elastic constant k33 is not specifically limited for the liquid crystal material constituting the liquid crystal panel in which the liquid crystal material is aligned vertically with respect to a substrate surface at the time when no electric field is applied. However, if the upper limit is daringly defined, the definition can be to satisfy a condition such that "the liquid crystal material maintains a liquid crystal phase at a room temperature" (in other words, the liquid crystal material has a molecular length that makes it possible to maintain the liquid crystal phase at the room temperature). Note that it is needless to say that the liquid crystal panel of the present invention excludes a liquid crystal panel that does not satisfy the above condition.

Example 6

Six liquid crystal panels 2 each having the configuration as shown in FIG. 2 were fabricated in the same manner as Example 1 except for: (i) using a liquid crystal cell 5 having the electrode width L of 3 μm, the electrode spacing S of 8 μm, and the cell gap d of 3.2 μm; (ii) filling and sealing, in this liquid crystal cell 5, a liquid crystal mixture of a "tetracyclic liquid crystal material" as represented by a structural formula (1):

(1)

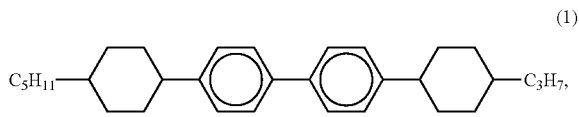

and "E-7" (produced by BDH Chemicals Inc., p-type nematic liquid crystal material); and (iii) variously changing a content (% by weight) of the tetracyclic liquid crystal material. Table 6 and FIG. 16 show all contents of tetracyclic liquid crystal materials of the six liquid crystal panels 2 and decay response times τ decay at a room temperature at the time when a voltage of 7V was applied to the liquid crystal panels 2.

TABLE 6

| E-7 | Tetracyclic Liquid Crystal Material | τ decay (ms) | Δε · Δn |
|---|---|---|---|
| 100 | 0 | 12.5 | 3.18 |
| 95 | 5 | 11.7 | 2.90 |
| 90 | 10 | 10.1 | 2.63 |
| 85 | 15 | 9.4 | 2.38 |
| 80 | 20 | 9.3 | 2.14 |
| 75 | 25 | 9.3 | 1.91 |

Figure 16:
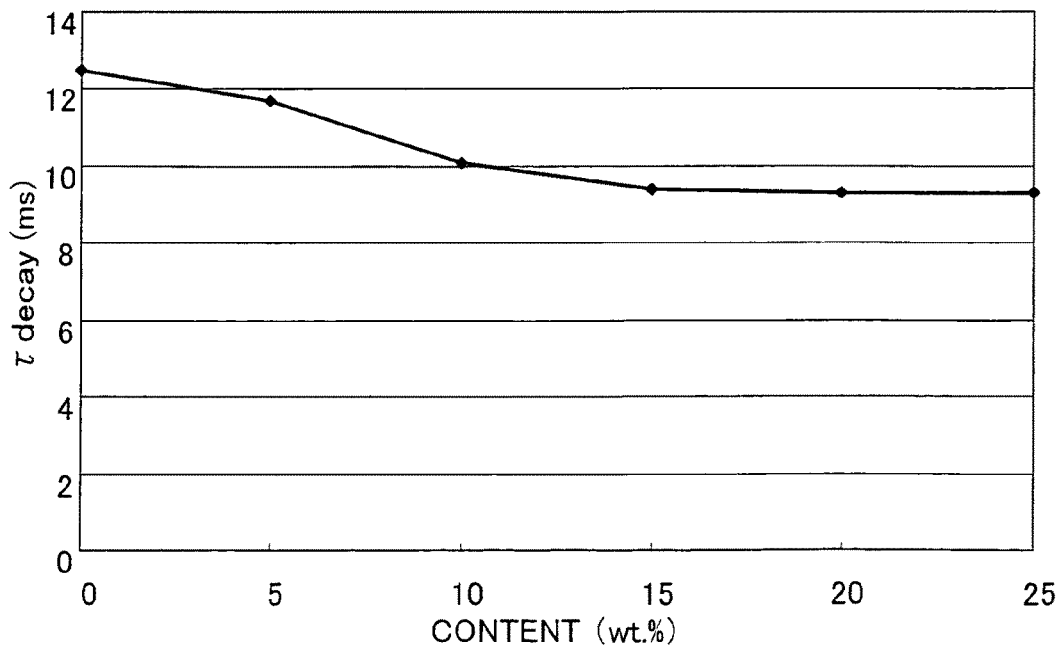
FIG. 16 is a graph illustrating a relationship between a decay response time and a content of a tetracyclic liquid crystal material in a liquid crystal panel fabricated in Example 6.

It is clear from the results shown in Table 6 and FIG. 16, that the content of tetracyclic liquid crystal material in the liquid crystal material is preferably 5% by weight or more and more preferably 10% by weight or more, for improving the decay response speed.

Note that, as described above, it is desirable to set the decay response time to approximately 10 ms or less for completing the decay within one frame. Accordingly, the content of the tetracyclic liquid crystal material is preferably 10% by weight or more, for obtaining the aforementioned effect.

That is, the liquid crystal material containing 10% by weight or more of a tetracyclic liquid crystal material exhibits an excellent response characteristic and has very high practical value. It is inferred that this is because k33 becomes larger by mixing the tetracyclic liquid crystal.

The upper limit of the content of the tetracyclic liquid crystal material is not specifically limited as long as the liquid crystal material (liquid crystal mixture) includes a p-type liquid crystal material and is capable of maintaining a liquid crystal phase.

When a ratio at which the tetracyclic liquid crystal material is added is large, a liquid crystal viscosity increases. Accordingly, in general, the tetracyclic liquid crystal material should be used minimally. However, different from the VA mode and the TN mode, in the present display mode, the flows of liquid crystal do not hamper a response. Therefore, as compared with the VA mode and the TN mode, a relatively larger amount of tetracyclic liquid crystal can be used.

However, it is clear that, when a ratio at which the tetracyclic liquid crystal material is added is large, the liquid crystal viscosity increases and, as shown in FIG. 16, the above effect is substantially saturated at the content of 15% by weight to 25% by weight of the tetracyclic liquid crystal material in the liquid crystal material. Therefore, in consideration of this point, the ratio at which the tetracyclic liquid crystal material is added may be 25% by weight or less, 20% by weight or less, or 15% by weight or less. This makes it possible to prevent the liquid crystal viscosity from increasing and to improve the decay response speed.

In the present Example, a chemical compound represented by the structural formula (1) was used as the tetracyclic liquid crystal material. However, the present invention is not limited to this.

In the tetracyclic liquid crystal material, all rings may be a phenyl group, or may contain a heteroatom, or alternatively may be condensed like a naphthalene ring.

Other examples of the tetracyclic liquid crystal material are compounds represented by the following structural formulae (2) to (7):

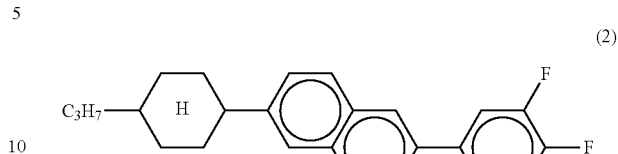

(2)

(3)

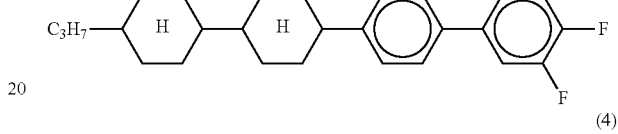

(4)

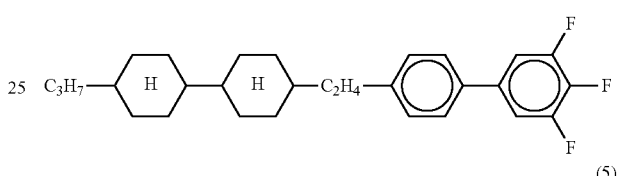

(5)

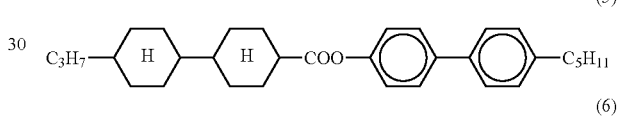

(6)

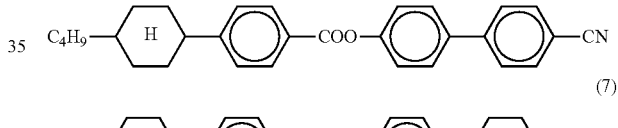

(7)

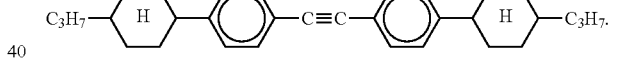

The present embodiment explains the p-type nematic liquid crystal material as an example of the p-type liquid crystal material. However, the present invention is not limited to this.

As described above, the liquid crystal panel 2 and the liquid crystal display device 1 forms electric field intensity distribution within the liquid crystal cell 5 due to electric filed application so as to achieve bend alignment of the liquid crystal material. The present embodiment suitably employs a liquid crystal material having a large refractive index anisotropy Δn or a liquid crystal material having a large dielectric constant anisotropy Δε. Examples of such p-type liquid crystal materials are F (fluorine) liquid crystal materials in addition to CN (cyano) liquid crystal materials (chiral nematic liquid crystal materials).

Note that, practically, it is desirable to increase Δε in a range where reliability does not deteriorate rather than increasing Δn, because a large panel phase difference Δnd deteriorates the viewing angle characteristic.

When both the dielectric constant anisotropy Δε and the refractive index anisotropy Δn become large, a liquid crystal viscosity increases. This tends to deteriorate the response characteristic. Therefore, when both the dielectric constant anisotropy Δε and the refractive index anisotropy Δn become too large, reliability deteriorates.

Accordingly, according to the results or Examples above, the product of the dielectric constant anisotropy Δε and the refractive index anisotropy Δn of the p-type liquid crystal material is preferably in a range of 1.3 to 3.1, and more preferably in a range of 1.3 to less than 2.4. In particular, by setting the product to be in the range of 1.3 to less than 2.4, an increase in liquid crystal viscosity can be prevented, and the decay can be completed within substantially one frame even when the p-type liquid crystal material is variously changed as described in Examples. Therefore, a high-speed response can be reliably achieved.

In Examples 1 through 6, as described above, explanations are given with reference to examples, that is, the verification results of applying, to the liquid crystal panels 2, a voltage of 6V to 7V (specifically, 7V) at which the maximum transmittance Tmax can be obtained. However, the present invention is not limited to these.

For example, even in a case where driving is carried out at a lower voltage as compared with a case, as a reference, where a voltage of 6 V to 7 V is applied to the liquid crystal panels 2 as described above, or in a case where the liquid crystal material is different, a relation of parameters used in Examples 1 to 6 above and the maximum transmittance Tmax or the response time τ decay results in the same tendency as the results of Examples 1 to 6 above though specific values may vary.

However, when a lower-voltage driving is to be carried out (i.e., for example, when a voltage lower than 6V is to be applied to the liquid crystal panel 2), the dielectric constant anisotropy Δε inevitably becomes larger in accordance with the lowered voltage.

When the dielectric constant anisotropy Δε becomes large, in general, the viscosity of the liquid crystal material increases.

Accordingly, though the display mode assumed in the present invention is characterized by a high-speed response as described above, a response takes more time in the case of such a low voltage driving, as compared with a case where driving is carried out at, for example, a voltage of 6V to 7V. As a result, an inherent high-speed response is hampered.

The following specifically verifies, by using Examples, preferable conditions for carrying out a high-speed response in the case of the low voltage driving.

Example 7

The present Example explains a result of verifying a composition of a preferable liquid crystal material in the case of low voltage driving.

In the present Example, two liquid crystal panels 2 each having a cell (1) or a cell (2) as the liquid crystal cell 5 and having the configuration as shown in FIG. 2 were fabricated in the same manner as Example 1 except for (i) using liquid crystal cells 5 having the electrode width L of 3 μm, the electrode spacing S of 8.0 μm, and the cell gap d of 3.4 μm; and (ii) filling and sealing, in the liquid crystal cells 5, a liquid crystal material having a composition shown in Table 7.

In the present Example, in the same manner as Example 1, an alignment film material "JALS-204" (Product Name, 5% by weight (solid content), γ-butyrolactone solution, produced by JSR Corporation) was applied, by the spin coat method, on the glass substrates 11 and 12 and baked at 200° C. for 2 hours so as to form alignment films 12 and 22. A dried film thickness of thus obtained alignment films 12 and 22 are 60 nm as in Example 1.

Table 7 shows all of composition, Δε, Δn, and rotational viscosity (γ1) of the liquid crystal material in each of the cells (1) and (2) used in these two liquid crystal panels 2, and a rise response time τ rise and a decay response time τ decay at a room temperature at the time when a voltage of 4.5 V is applied to these liquid crystal panels 2.

TABLE 7

|  | Cell (1) | Cell (2) |
|---|---|---|
| Composition of Liquid Crystal Material | "SD-5674" 100 wt. % | "SD-5674" 95 wt. % Alkenyl Compound 5 Wt. % |
| Dielectric Constant Anisotropy Δε | 23.6 | 23.0 |
| Refractive Index Anisotropy Δn | 0.10 | 0.10 |
| Rotational Viscosity γ1 | 350 mPa · s | 210 mPa · s |
| Response Time (τ rise) | 28 ms | 14 ms |
| Response Time (τ decay) | 17 ms | 8 ms |

Note that an alkenyl compound represented by the following structural formula (8) was used as the alkenyl compound shown in Table. 7:

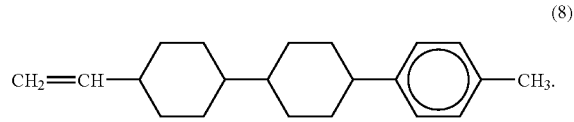

(8)

As a main component of the liquid crystal material, "SD-5674" (Product Name, produced by Chisso Petrochemical Corporation, p-type liquid crystal material) was used.

When a voltage of 0V to 7V was applied to the cell (2), the maximum transmittance Tmax was a high value, 68%. At the maximum transmittance Tmax, an applied voltage (i.e., a driving voltage at which the maximum transmittance Tmax was obtained) was 7V.

Meanwhile, when a voltage of 7V was applied to the liquid crystal panel 2 using the cell (1), the transmittance of the liquid crystal panel 2 was 65.2%.

It is clear from the results shown in Table 7 that the response time can be drastically reduced in a case where the liquid crystal material contains the alkenyl compound as described above.

The alkenyl compound is a neutral material (whose Δε is substantially 0) and functions as a viscosity reducing agent. Accordingly, a liquid crystal composition containing the alkenyl compound as described above has a low viscosity, and can have a high-speed response.

Note that the alkenyl compound is not specifically limited as long as an alkenyl group is contained. The alkenyl compound may be, for example, any commercially available alkenyl compound. Further, as the alkenyl compound, only one kind of alkenyl compound may be used or a mixture of two or more kinds may be used as appropriate.

In particular, examples of the alkenyl compound used in the present invention as a suitable material are alkenyl compounds represented by the following general formulae (9) and (10):

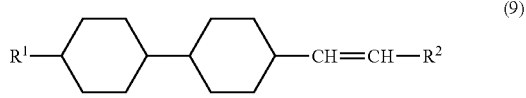

(9)

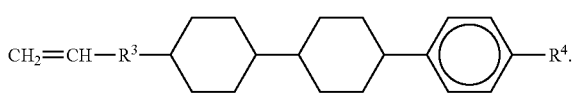

(10)

In the general formula (9), $R^1$ represents an alkyl group or an alkoxy group, and $R^2$ represents an alkyl group, an alkoxy group or a hydrogen atom. Further, in the general formula (10), $R^3$ represents a "—$(CH_2)_n$—" group; n represents 0 or a whole number of at least 1; and $R^4$ represents an alkyl group or an alkoxy group.

The alkenyl compound is preferably a compound where (i) the $R^1$ and $R^4$ are an alkyl group of the carbon number of 1 to 8 or an alkoxy group of the carbon number of 1 to 7 and (ii) the $R^2$ is an alkyl group of the carbon number of 1 to 8, an alkoxy group of the carbon number 1 to 7 or a hydrogen atom, because such a compound can be easily obtained and the like. Note that a specific example of the alkenyl compound represented by the general formula (10) is the alkenyl compound represented by the structural formula (8).

A content of the alkenyl compound may be set as appropriate in accordance with Δε or a driving voltage so that a desired effect is obtained. The content is not specifically limited.

However, the alkenyl compound as a viscosity reducing agent is a neutral material (whose Δε is substantially 0) like the compound represented by the structural formula (8), and Δε of a whole system decreases in accordance with the content. Therefore, when the content of the alkenyl compound is large, a driving voltage for a liquid crystal element becomes high. In particular, when the content of the alkenyl compound is more than 30% by weight, Δε drastically decreases and the alkenyl compound having such a content is not practical.

Meanwhile, in a case where the content of the alkenyl compound is too small, an effect as the viscosity reducing agent cannot be obtained. Therefore, as the content of the alkenyl compound is preferably set in a range of 3% by weight to 30% by weight.

In the present Example, as shown in Table 7, in the case where the content of the alkenyl compound represented by the structural formula (8) was 5% by weight, Δε was 23.0. However, in the case of a liquid crystal mixture containing 30% by weight of the same alkenyl compound, Δε was 16.5 and a driving voltage was 7.0 V that was an upper limit of the withstand voltage of the current driver IC.

Note that the alkenyl compound was added for the purpose of reducing the liquid crystal viscosity. It is clear that the effect of the present invention as described above can be obtained by a compound other than the liquid crystal compound represented by the structural formula (8).

Example 8

In the case of low voltage driving as described above, as the dielectric constant anisotropy Δε of the liquid crystal material increases, there tends to occur a problem of image sticking due to an increase in ratio of ionic impurities in addition to the problem such that a high-speed response is hampered. Accordingly, the present Example explains below a result of verifying conditions where image sticking is difficult to occur.

Figure 17A:
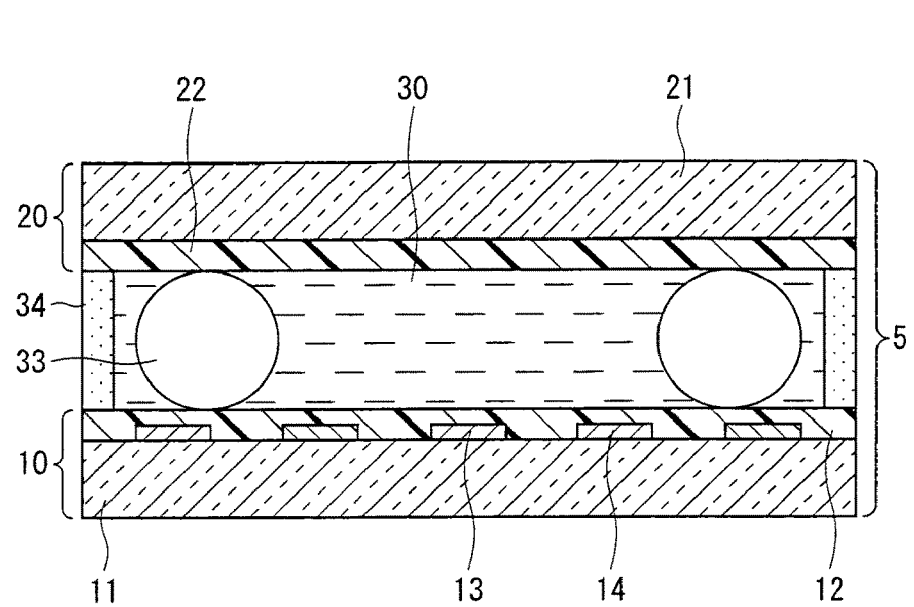
FIG. 17(a) is a cross sectional view schematically illustrating an outline configuration of a substantial part of a test cell used in evaluation of image sticking.
Figure 17B:
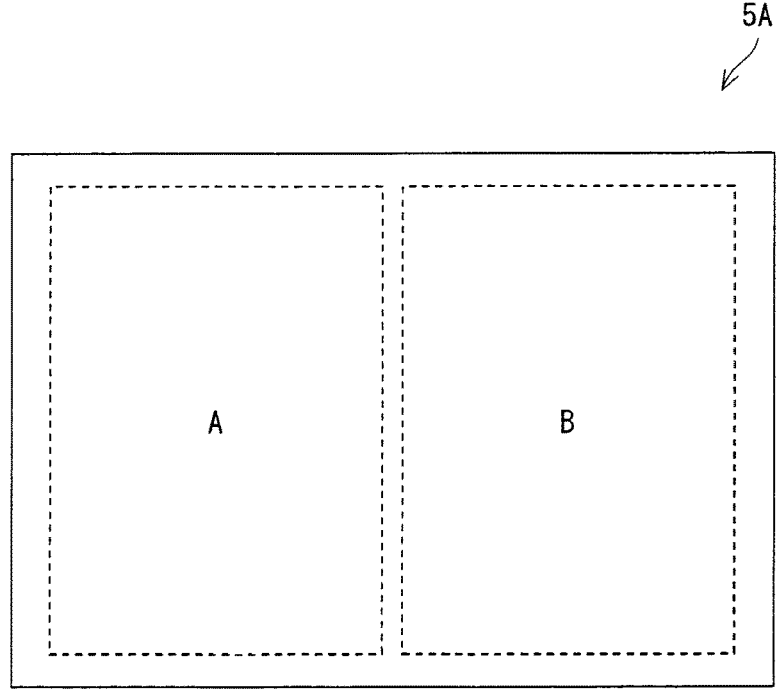
FIG. 17(b) is a plan view schematically illustrating an outline configuration of a substantial part of the test cell shown in FIG. 17(a).

FIGS. 17(a) and 17(b) show a test cell (liquid crystal cell) used for evaluation of image sticking. FIG. 17(a) is a cross sectional view schematically illustrating an outline configuration of a substantial part of the test cell used in the evaluation of image sticking. FIG. 17(b) is a plan view schematically illustrating an outline configuration of a substantial part of the test cell shown in FIG. 17(a).

In FIGS. 17(a) and 17(b), members that have identical functions to those of members of the liquid crystal cell 5 in the liquid crystal panel 2 shown in FIG. 2 are given the same reference signs, and the explanations thereof are omitted.

As shown in FIGS. 17(a) and 17(b), the test cell 5A used in the evaluation of image sticking in the present Example has the same configuration as the liquid crystal cell 5 shown in FIG. 2, except that each of the right and left halves of a display area surrounded by the sealing agent 34 provided to peripheries of the substrates 10 and 20 can be independently driven.

In the present Example, as described above, two liquid crystal panels each of which had the same configuration as in FIG. 2 and had a cell (3) or a cell (4) as the test cell 5A instead of the liquid crystal cell 5 were fabricated in the same matter as Example 1 except that each test cell 5A was fabricated so as to have cell conditions below and formed so that each of the right and left halves of the display area could be independently driven as described above.

The cells (3) and (4) fabricated in the present Example was arranged to have the electrode width L of 3.0 μm, the electrode spacing S of 8.0 μm, and the cell gap d of 3.4 μm. For the liquid crystal layers 30 of the cells (3) and (4), "SD-5674" (Product Name, p-type liquid crystal material, produced by Chisso Petrochemical Corporation) was used.

Regarding the cell (3), as in Example 1, an alignment film material "JALS-204" (Product Name, 5% by weight (solid content), γ-butyrolactone solution, produced by JSR Corporation) was applied, by the spin coat method, on the glass substrates 11 and 21, and baked at 200° C. for 2 hours so as to form polyimide alignment films 12 and 22. A dried film thickness of thus obtained alignment films 12 and 22 was 60 nm as in Example 1.

Meanwhile, regarding the cell (4), an alignment film material "OA-044" (Product Name, 4% by weight (solid content), NMP (N-methylpyrrolidone) solution, produced by Nissan Chemical Industries Inc.) was applied, by the spin coat method, on the glass substrates 11 and 21 at a revolution speed of 1000 rpm for 10 seconds and then at a revolution speed of 3500 rpm for 30 seconds. Subsequently, the glass substrates 11 and 21 were dried at 90° C. for 5 minutes on a hot plate, and then baked at 200° C. for 90 minutes so as to form siloxane inorganic alignment films as the alignment films 12 and 22. A dried thickness of thus obtained alignment films 12 and 22 was 60 nm as with the cell (3).

The evaluation of image sticking was carried out as follows. First, no voltage was applied to a region A that was the left half of the display area of the test cell 5A shown in FIG. 17(b) so that a black display was carried out in the region A, and a voltage of 8V was applied to a region B that was a right half of the display area so that a white display was carried out for a predetermined period in the region B. Then, the whole display area (i.e., the display region A and the display region B) was caused to display an intermediate luminance at 4V for 3 hours. Subsequently, whether or not image sticking had occurred at a center of the display area was checked so that whether or not image sticking had occurred was determined. Table 8 shows a result of the determination together with cell conditions and lighting periods of the white display.

TABLE 8

|  |  | Cell (3) | Cell (4) |
|---|---|---|---|
| Cell Conditions | Electrode Width L | 3 μm | 3 μm |
|  | Electrode Spacing S | 8 μm | 8 μm |
|  | Cell Gap d | 3.4 μm | 3.4 μm |
|  | Alignment Film | Polyimide Alignment Film "JALS-204" | Siloxane Inorganic Alignment Film "OA-044" |
|  | Liquid Crystal Material | "SD-5674" | "SD-5674" |
| Occurrence of Image Sticking | After 1 Hour | Not Occurred | Not Occurred |
|  | After 3 Hours | Occurred | Not Occurred |
|  | After 10 Hours | Occurred | Not Occurred |
|  | After 100 Hours | Occurred | Not Occurred |

In a liquid crystal having a high Δε (high Δε liquid crystal) as used in the present Example, a content of ionic impurities is relatively high and image sticking tends to occur. However, as shown in Table 8, the occurrence of image sticking can be prevented by using, as the alignment films 11 and 22, an inorganic alignment film, in particular a siloxane alignment film. This is because a siloxane alignment film has a low film resistance as compared with a polyimide alignment film. This allows an electric charge to be easily released, and image sticking is difficult to occur.

Embodiment 2

Embodiment 2 is explained below with reference to FIGS. 18 to 20. Note that only a difference with Embodiment 1 is explained in the present Embodiment. Members that have identical functions to those of members described in Embodiment 1 are given the same reference signs, and the explanations thereof are omitted.

Figure 18:
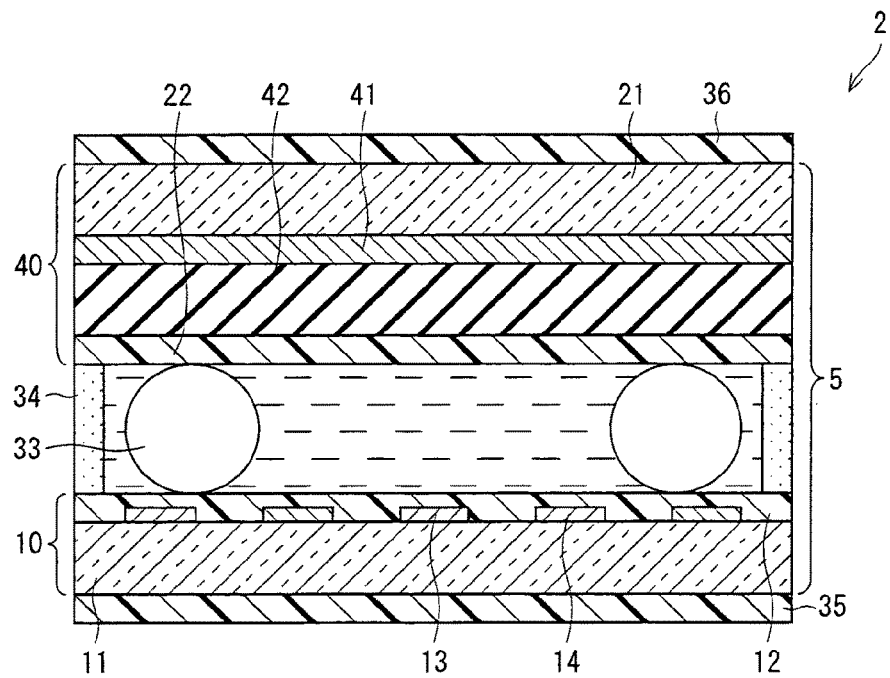
FIG. 18 is a cross sectional view schematically illustrating an outline configuration of a substantial part of a liquid crystal cell used in a liquid crystal display device according to another embodiment of the present invention.

FIG. 18 is a cross sectional view schematically illustrating an outline configuration of a substantial part of a liquid crystal panel 2 of the present Embodiment.

The liquid crystal panel 2 of the present Embodiment has the same configuration as a liquid crystal panel 2 shown in FIG. 2, except that the liquid crystal panel 2 of the present Embodiment includes, as a counter substrate opposed to a substrate 10 (array substrate, electrode substrate) provided with comb-teeth shape electrodes 13 and 14, a substrate 40 provided with an electrode 41 (common electrode, electrode film) and a dielectric layer 42 as shown in FIG. 18, in place of a substrate 20 shown in FIG. 2.

That is, in the present Embodiment, the substrate 10 also has a configuration such that the comb-teeth shape electrodes 13 and 14 (pixel electrode and common electrode) for applying a electric field parallel to a substrate surface are provided on a glass substrate 11 and an alignment film 12 is provided so as to cover these comb-teeth shape electrodes 13 and 14.

Meanwhile, the electrode 41 is an allover electrode and formed on a glass substrate 21 so as to cover a display area (i.e., an area surrounded by a sealing agent 34) of the substrate 40 and be formed substantially all over the glass substrate 21 (that is, substantially all area of one main surface of the glass substrate 21).

A material of the electrode 41 is not specifically limited. The material to be used may be an electrode material that is the same as an electrode material shown as an example of the comb-teeth shape electrodes 13 and 14 in Embodiment 1. In the liquid crystal panel 2 shown in FIG. 18, the substrate 40 is used as an upper substrate. In this case, a transparent electrode film such as ITO can be used as the electrode 41.

The substrate 40 shown in FIG. 18 has a configuration in which the electrode 41, the dielectric layer 42, and an alignment film 22 are provided in this order on the glass substrate 21.

According to the present Embodiment, reduction in a driving voltage can be achieved by providing the overall electrode 41 that covers substantially all over the upper surface (specifically, an entire display area) of the substrate 40 opposed to the substrate 10 provided with the comb-teeth shape electrodes 13 and 14 as described above. The following specifically verifies this by using Example.

Example 9

First, an acryl resist film having a dielectric constant ε of 3.7 and a film thickness of 3.2 μm was formed on the glass substrate 21 that was provided with the transparent electrode 41 made of ITO all over one main surface of the glass substrate 21. Thereby, the dielectric layer 42 that covered the electrode 41 was formed.

Then, on the dielectric layer 42, an alignment film material "JALS-204" (Product Name, 5% by weight (solid content), γ-butyrolactone solution, produced by JSR Corporation) was applied by a spin coat method, and then baked and dried at 180° C. for 2 hours. As a result, the substrate 40 in which the alignment film 22 was provided on the dielectric layer 42 was formed. A dried film thickness of thus obtained alignment film 22 was 60 nm.

Meanwhile, on the glass substrate 11 provided with the ITO comb-teeth shape electrodes 13 and 14 having an electrode width L of 3 μm and an electrode spacing S of 8 μm, the alignment film 12 that was the same as the alignment film 22 was formed in the same manner as the alignment film 22. As a result, the substrate 10 was formed. Note that a thickness of the electrode 41 and the comb-teeth shape electrodes 13 and 14 were set to 1000 Å.

Then, the substrate 10 was bonded to the substrate 40 via a bead spacer as a spacer 33, in the same manner as Example 1 so that the liquid crystal cell 5 having a cell gap d of 3.4 μm was fabricated.

Subsequently, "SD-5674" (Product Name, Δε=23.6 and Δn=0.10, produced by Chisso Petrochemical Corporation) as a liquid crystal material was filled and sealed in the liquid crystal cell 5 so that a liquid crystal layer 30 was formed. Then, polarizers 35 and 36 were bonded on front and back surfaces of the liquid crystal cell 5 in the same manner as in FIG. 4 so that transmission axes of the respective polarizers 35 and 36 are orthogonal. As a result, the liquid crystal panel 2 having the configuration shown in FIG. 18 was fabricated.

A voltage-transmittance characteristic of the liquid crystal panel 2 at a room temperature (25° C.) was measured by changing voltages (rectangular waves) to be applied between (i) the comb-teeth shape electrode 13 that was a pixel electrode and (ii) the comb-teeth shape electrode 14 that was a common electrode (V=0V) and the electrode 41 in the liquid crystal panel 2 fabricated as described above. FIG. 19 shows a result of the measurement.

Figure 19:
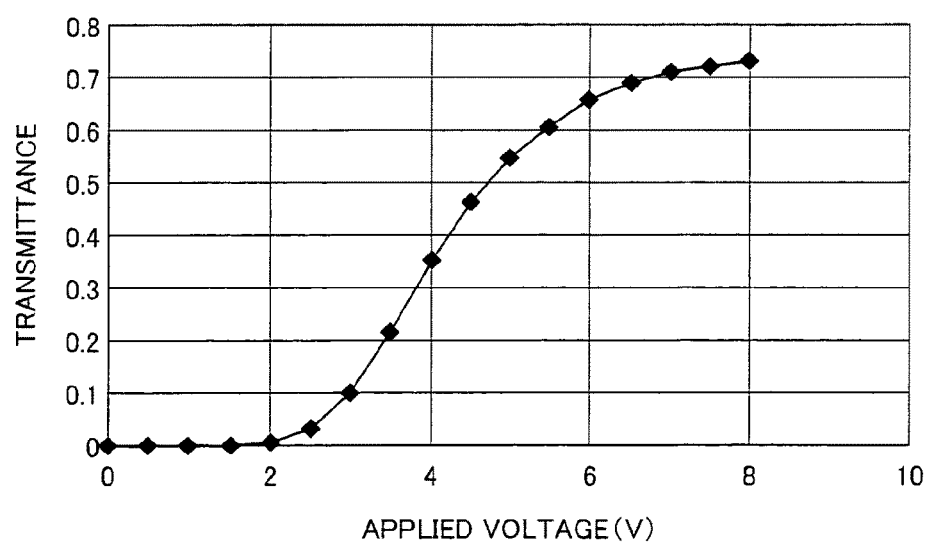
FIG. 19 is a graph illustrating a voltage-transmittance characteristic of a liquid crystal panel fabricated in Example 9.

As shown in FIG. 19, when a voltage of 7V was applied to the liquid crystal panel 2 (that is, a potential of the comb-teeth shape electrode 13 was set to 7V and potentials of the comb-teeth shape electrodes 14 and the electrode 41 were set to 0V), a transmittance of the liquid crystal panel 2 was 70.9%.

Meanwhile, when a voltage of 7V was applied to the liquid crystal panel 2 shown in FIG. 2 that employs a cell (1) of Example 7 as shown in Example 7 (that is, a potential of the comb-teeth shape electrode 13 was set to 7V and a potential of the comb-teeth shape electrode 14 and the electrode 41 were set to 0V), a transmittance of the liquid crystal panel 2 was 65.2%.

From this, it is clear that, by providing the electrode 41 to the substrate 40, the voltage-transmittance characteristic can be improved as compared with a case where the electrode 41 is not provided.

According to the present Embodiment, as described above, by providing the electrode 41 on the substrate 40, it becomes possible to obtain the same transmittance as in a case where the electrode 41 is not provided, at a lower voltage as compared with a case where the electrode 41 is not provided. Therefore, reduction in driving voltage can be achieved.

Figure 20:
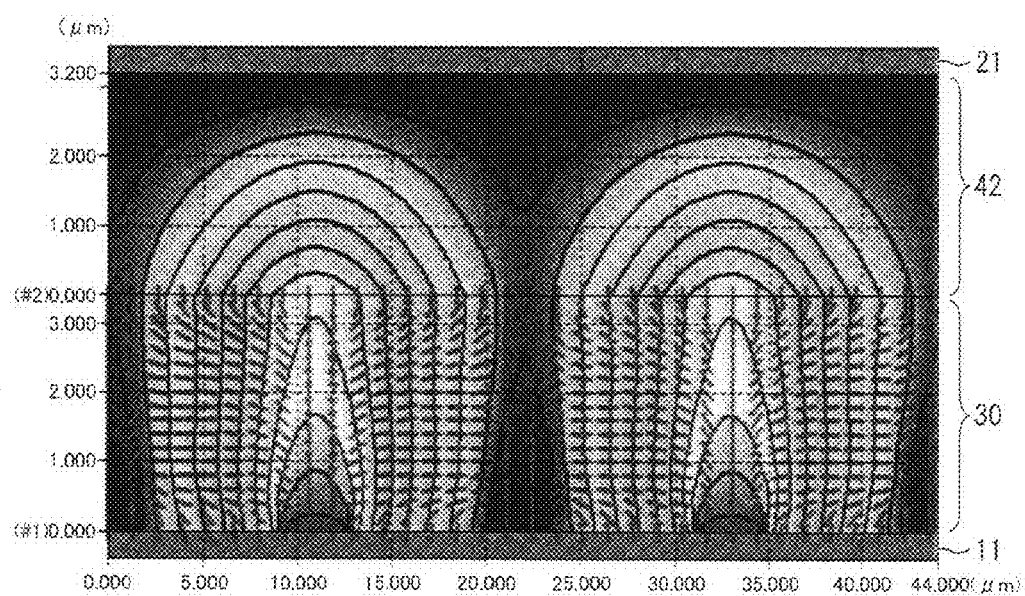
FIG. 20 is a diagram illustrating electric field distribution and liquid crystal director distribution in a liquid crystal cell at the time when a voltage of 7V is applied to the liquid crystal panel fabricated in Example 9.

FIG. 20 shows a result of calculating, based on physical properties of a material and a cell configuration that were used in the present Example 9, electric field distribution within the liquid crystal cell 5 and liquid crystal director distribution within the liquid crystal cell 5 in a case where a voltage of 7V is applied to the liquid crystal panel 2 fabricated in Example 9. Note that, in FIG. 20, the comb-teeth shape electrodes 13 and 14, the electrode 41, and the alignment films 12 and 22 are omitted.

From a result shown in FIG. 20, it is clear that, in the liquid crystal panel 2 fabricated in the present Example 9, rotation of p-type liquid crystal molecules occur up to the vicinity of a surface of the substrate 40 that is a counter substrate.

In other words, a reason why the transmittance of the liquid crystal panel 2 fabricated in the present Example 9 is high is that an electric flux line is deformed due to influence of the dielectric layer 42 and the electrode 41 (V=0) that are provided on the substrate 40 that is a counter electrode and liquid crystal in the vicinity of the substrate 40 that is an upper substrate is more greatly tilted in a direction (horizontal direction) parallel to the substrate.

In the present Embodiment, an explanation is given with reference to a case, as an example, where the electrode 41, the dielectric layer 42, and the alignment film 22 are provided in this order on the glass substrate 21, as shown in FIG. 18. However, the present invention is not limited to this.

The electrode 41 may be provided in any way, as long as, as shown in FIG. 20, the electrode 41 can change the electrode distribution (electric flux line) within the liquid crystal cell 5 so that the p-type liquid crystal molecules 31 in the vicinity of the substrate 40 that is a counter substrate are tilted more greatly in the horizontal direction than the p-type liquid crystal molecules 31 in the vicinity of a center of the liquid crystal layer 30.

Accordingly, the electrode 41 need only be provided to the substrate 40 on an opposite side of the substrate 10 provided with the comb-teeth shape electrodes 13 and 14. Further, the electrode 41 need only be provided on at least one surface of the glass substrate 21 in the substrate 40.

For example, the substrate 40 may have a configuration such that (i) the dielectric layer 42 and the alignment film 22 are provided in this order on a surface of the glass substrate 21 which surface is opposed to the liquid crystal layer 30 and (ii) the electrode 41 is provided on the other surface of the glass substrate 21 opposite to the surface opposing the liquid crystal layer 30.

Note that, as described above, the dielectric layer 42 is provided between the glass substrate 21 and the alignment layer 22 in any case. This makes it possible to cause the electric flux line in the liquid crystal cell 5 to be a wide curve like an arc in the dielectric layer 42 in the vicinity of the glass substrate 21 (short of the glass substrate 21 when the dielectric layer 42 is viewed from a side provided with the liquid crystal layer 30), as shown in FIG. 20. As a result, the p-type liquid crystal molecules 31 in the vicinity of the substrate 40 can be more greatly tilted in the horizontal direction than the p-type liquid crystal molecules 31 in the vicinity of the center of the liquid crystal layer 30.

Embodiment 3

Figure 21:
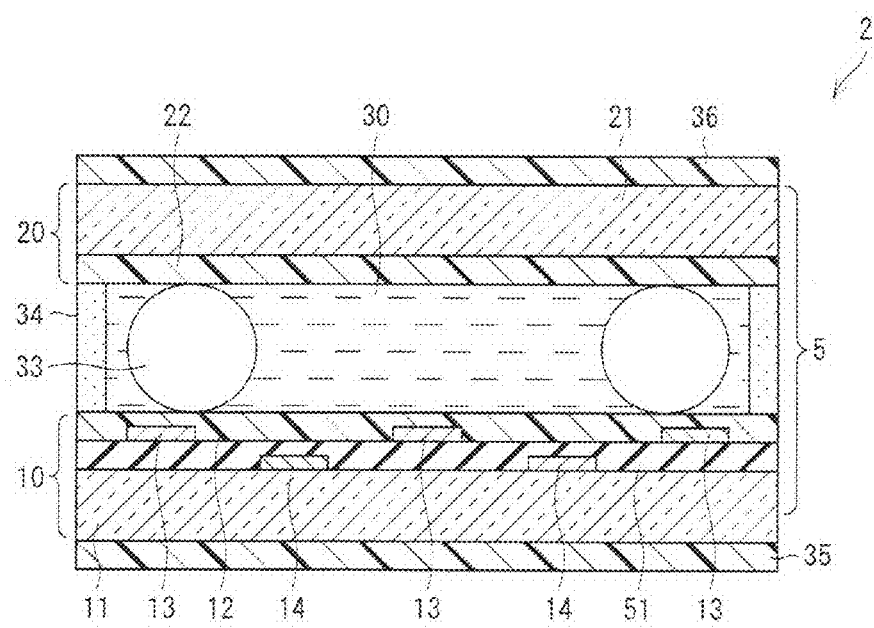
FIG. 21 is a cross sectional view schematically illustrating an outline configuration of a substantial part of a liquid crystal panel according to still another embodiment of the present invention.

The following explains the present Embodiment, with reference to FIG. 21. Note that only a difference from Embodiments 1 and 2 is explained in the present Embodiment. Members that have identical functions to those of members described in Embodiments 1 and 2 are given the same reference signs, and the explanations thereof are omitted.

In Embodiments 1 and 2, an explanation is given with reference to a case, as an example, where comb-teeth shape electrodes 13 and 14 (i.e., pixel electrode and common electrode) are provided in the same layer on a glass substrate 11 of one substrate 10. However, the present invention is not limited to this.

FIG. 21 is a cross sectional view schematically illustrating an outline configuration of a substantial part of a liquid crystal panel 2 of the present Embodiment.

The liquid crystal panel 2 of the present Embodiment has the same configuration as a liquid crystal panel 2 shown in FIG. 2, except that the comb-teeth shape electrodes 13 and 14 each of which is electric field application means for applying an electric field to a liquid crystal layer 30 are provided on a surface of the substrate 10 which surface is opposed to the liquid crystal layer 30 so that a dielectric layer 51 is provided between the comb-teeth shape electrodes 13 and 14.

That is, the substrate 10 has a configuration such that: the comb-teeth shape electrode 14 made of ITO or the like is provided as a common electrode on the glass substrate 11; the dielectric layer 51 is provided on the glass substrate 11 so as to cover the comb-teeth shape electrode 14; further on the dielectric layer 51, the comb-teeth shape electrode 13 made of ITO or the like is provided as a pixel electrode; and an alignment film 12 is provided on the dielectric layer 51 so as to cover the comb-teeth shape electrode 13.

As shown in FIG. 21, the comb-teeth shape electrodes 13 and 14 are provided through the dielectric layer 51 provided between the comb-teeth shape electrodes 13 and 14 so that comb-teeth portions of the comb-teeth shape electrodes 13 and 14 are in parallel to each other and alternately provided in a planer view (that is, when the substrate 10 is viewed from a direction perpendicular to the substrate).

In the present Embodiment, an electrode spacing S of the comb-teeth shape electrodes 13 and 14 are set to be shorter than a cell gap d so that a fringe electric field is produced between the comb-teeth shape electrodes 13 and 14.

FIG. 21 illustrates, as an example, a case where a substrate 20 shown in FIG. 2 is provided as a counter substrate opposed to the substrate 10. However, the present Embodiment is not limited to this. It is needless to say that a substrate 40 shown in FIG. 18 may be used as the counter substrate.

According to the present Embodiment, a process yield can be improved as compared with Embodiments 1 and 2. Therefore, according to the present Embodiment, it becomes possible to fabricate, at a low cost and steadily, a liquid crystal panel 2 capable of simultaneously achieving characteristics of a high-speed response, a wide viewing angle and a high contrast, and a liquid crystal display device 1 including the liquid crystal panel 2.

Note that the comb-teeth shape electrodes 13 and 14 may be formed in a letter V shape or a zigzag form.

As described above, each of the liquid crystal panel of the present invention and the liquid crystal display device including the liquid crystal panel carries out driving by a so-called lateral electric field that is parallel to the substrate surface while maintaining a high contrast due to the vertical alignment. This makes it possible to achieve a wide viewing angle characteristic and a high contrast characteristic in a simple pixel configuration. Further, because an initial bend transition operation is unnecessary, practical bend alignment can be achieved.

In particular, when the liquid crystal panel and the liquid crystal display device are configured to have electrodes whose electrode width is set to 5 µm or less and electrode spacing is set to 15 µm or less, a high transmittance can be obtained by a practical driving voltage. Further, by setting the $\Delta\epsilon \cdot \Delta n$ to be in a range of 1.3 to 3.1, a high transmittance and a high-speed response can be obtained practically. Therefore, according to the present invention, it is possible to provide a practical liquid crystal panel capable of simultaneously achieving characteristics of (i) a wide viewing angle equivalent to that of an MVA mode or an IPS mode, (ii) a high-speed response as fast as or faster than that of an OCB mode, and (ii) a high contrast.

In the liquid crystal panel, a product ($\Delta n d$) of a layer thickness d and a refractive index anisotropy $\Delta n$ of the liquid crystal material is preferably 0.3 µm or more and 0.7 µm or less.

As the $\Delta n d$ becomes larger, the maximum transmittance tends to become larger. However, there is phase difference distribution within a liquid crystal cell plane. In a region where $\Delta n d$ is over a half wavelength, the transmittance tends to decrease while the layer thickness d of the liquid crystal material increases. Therefore, by setting the $\Delta n d$ within the range above, a high transmittance and a high-speed response can be more reliably achieved.

Further, an elastic constant k33 of the liquid crystal material is preferably 15 pN or more.

A time for a decay response needs to be approximately 10 ms or less so that a decay completes within one frame. As described above, by using the liquid crystal material having the elastic constant k33 of 15 pN or more, the decay can be completed within one frame. As a result, both the transmittance and the decay response speed can be satisfactory.

Further, the liquid crystal material preferably includes 10% or more tetracyclic liquid crystal material.

The elastic constant k33 becomes large by including a tetracyclic liquid crystal material in the liquid crystal material. In particular, by including 10% or more tetracyclic liquid crystal material in the liquid crystal material, a decay can be completed within one frame. Therefore, the configuration above makes it possible to provide a liquid crystal panel that has a very high practical value.

One specific example of the liquid crystal panel above is a liquid crystal panel where: the p-type liquid crystal material is a p-type nematic liquid crystal material; the electrodes are comb-teeth shape electrodes provided on at least one substrate of the pair of substrates; and the p-type nematic liquid crystal material is arranged in homeotropic alignment at the time when no electric field is applied.

The liquid crystal material preferably includes a compound containing an alkenyl group.

The compound containing the alkenyl group is a material whose $\Delta\epsilon$ is substantially 0 and functions as a viscosity reducing agent. Therefore, by including the compound containing the alkenyl group in the liquid crystal material, a viscosity of the liquid crystal material can be reduced and a response time can be significantly shortened.

The liquid crystal panel preferably includes an alignment film made of a siloxane inorganic material on an opposing surface of at least one substrate out of the pair of substrates, the opposing surface facing a liquid crystal layer made of the liquid crystal material.

The alignment film made of the siloxane inorganic material has a low film resistance as compared with an organic alignment film such as a polyimide alignment film, and an electric charge can be easily released. Therefore, image sticking can be prevented, even in a case where a liquid crystal material having a high dielectric constant anisotropy $\Delta\epsilon$ is used though such a liquid crystal material has a relatively high content of ionic impurities and tends to have image sticking.

Further, it is preferable that, in the liquid crystal panel, the electrodes are provided on one substrate out of the pair of substrates and an electrode film that covers all over a display area is provided on the other substrate.

In this way, the electrode film that covers all over the display area is provided on the substrate opposing to the substrate provided with the electrode for applying, to the liquid crystal material, an electric field parallel to the substrate surface. This makes it possible to improve the voltage-transmittance characteristic as compared with a case where the electrode film is not provided. Therefore, according to the configuration above, the same transmittance as a transmittance in a case where the electrode film is not provided can be obtained at a voltage lower than a voltage in the case where the electrode film is not provided.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A liquid crystal panel comprising:
   a liquid crystal material sandwiched by a pair of substrates; and
   electrodes for applying, to the liquid crystal material, an electric field parallel to a substrate surface,
   the liquid crystal material including a p-type liquid crystal material,
   the p-type liquid crystal material being vertically aligned with respect to the substrate surface at the time when no electric field is applied,
   the electrodes having an electrode width of 5 µm or less and an electrode spacing of 15 µm or less,
   the p-type liquid crystal material having, in a range of 1.3 to 3.1, a product of a dielectric constant anisotropy $\Delta\epsilon$ and a refractive index anisotropy $\Delta n$.

2. The liquid crystal panel as set forth in claim 1, wherein a product of a layer thickness d of the liquid crystal material and the refractive index anisotropy $\Delta n$ is 0.3 µm or more and 0.7 µm or less.

3. The liquid crystal panel as set forth in claim 1, wherein the liquid crystal material has an elastic constant k33 of 15 pN or more.

4. A liquid crystal panel comprising:
a liquid crystal material sandwiched by a pair of substrates; and
electrodes for applying, to the liquid crystal material, an electric field parallel to a substrate surface,
the liquid crystal material including a p-type liquid crystal material,
the p-type liquid crystal material being vertically aligned with respect to the substrate surface at the time when no electric field is applied,
the electrodes having an electrode width of 5 µm or less and an electrode spacing of 15 µm or less,
the p-type liquid crystal material having, in a range of 1.3 to 3.1, a product of a dielectric constant anisotropy $\Delta\epsilon$ and a refractive index anisotropy $\Delta n$, and
wherein the liquid crystal material includes 10% or more tetracyclic liquid crystal material.

5. The liquid crystal panel as set forth in claim 1, wherein:
the p-type liquid crystal material is a p-type nematic liquid crystal material; and
the electrodes are comb-teeth shape electrodes provided on at least one substrate out of the pair of substrates; and
the p-type nematic liquid crystal material is arranged in homeotropic alignment at a time when no electric field is applied.

6. The liquid crystal panel as set forth in claim 1, wherein the liquid crystal material includes a compound containing an alkenyl group.

7. The liquid crystal panel as set forth in claim 1, further comprising an alignment film made of a siloxane inorganic material on an opposing surface of at least one substrate out of the pair of substrates, the opposing surface facing a liquid crystal layer made of the liquid crystal material.

8. The liquid crystal panel as set forth in claim 1, wherein:
the electrodes are provided on one substrate of the pair of substrates; and
an electrode film is provided on the other substrate of the pair of substrates, the electrode film covering all over a display area.

9. A liquid crystal display device comprising the liquid crystal panel as set forth in claim 1.

10. The liquid crystal panel as set forth in claim 4, wherein a product of a layer thickness d of the liquid crystal material and the refractive index anisotropy $\Delta n$ is 0.3 µm or more and 0.7 µm or less.

11. The liquid crystal panel as set forth in claim 4, wherein:
the p-type liquid crystal material is a p-type nematic liquid crystal material; and
the electrodes are comb-teeth shape electrodes provided on at least one substrate out of the pair of substrates; and
the p-type nematic liquid crystal material is arranged in homeotropic alignment at a time when no electric field is applied.

12. The liquid crystal panel as set forth in claim 4, wherein the liquid crystal material includes a compound containing an alkenyl group.

13. The liquid crystal panel as set forth in claim 4, further comprising an alignment film made of a siloxane inorganic material on an opposing surface of at least one substrate out of the pair of substrates, the opposing surface facing a liquid crystal layer made of the liquid crystal material.

14. The liquid crystal panel as set forth in claim 4, wherein:
the electrodes are provided on one substrate of the pair of substrates; and
an electrode film is provided on the other substrate of the pair of substrates, the electrode film covering all over a display area.

* * * * *